US011544928B2

(12) United States Patent
Bhanu et al.

(10) Patent No.: US 11,544,928 B2
(45) Date of Patent: Jan. 3, 2023

(54) ATHLETE STYLE RECOGNITION SYSTEM AND METHOD

(71) Applicant: The Regents of the University of California, Oakland, CA (US)

(72) Inventors: Bir Bhanu, Riverside, CA (US); Hengyue Liu, Riverside, CA (US); Runze Li, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 16/904,513

(22) Filed: Jun. 17, 2020

(65) Prior Publication Data

US 2020/0394413 A1 Dec. 17, 2020

Related U.S. Application Data

(60) Provisional application No. 62/862,578, filed on Jun. 17, 2019.

(51) Int. Cl.
*G06V 20/40* (2022.01)
*G06K 9/62* (2022.01)
*A63B 69/00* (2006.01)
*G06N 3/04* (2006.01)
*A63B 67/00* (2006.01)
(Continued)

(52) U.S. Cl.
CPC ............ *G06V 20/42* (2022.01); *A63B 67/002* (2013.01); *A63B 69/002* (2013.01); *G06K 9/6267* (2013.01); *G06N 3/0454* (2013.01); *G06N 3/08* (2013.01); *G06V 10/82* (2022.01); *G06V 40/23* (2022.01)

(58) Field of Classification Search
CPC .. A63B 67/002; A63B 69/002; G06N 3/0454; G06N 3/08; G06N 3/0472; G06N 3/088; G06K 9/6267; G06K 9/6271; G06V 10/82; G06V 20/42; G06V 40/23; G06V 40/25
See application file for complete search history.

(56) References Cited

U.S. PATENT DOCUMENTS 6,098,458 A 8/2000 French et al.
6,308,565 B1 10/2001 French et al.
(Continued)

FOREIGN PATENT DOCUMENTS

CN 111881887 A * 11/2020

OTHER PUBLICATIONS

Cao et al. "Realtime Multi-Person 2D Pose Estimation using Part Affinity Fields" CVPR 2017 arXiv: 1611.08050 [cs.CV] (Year: 2017).*

(Continued)

*Primary Examiner* — Ian L Lemieux
(74) *Attorney, Agent, or Firm* — Ivan M. Posey, Esq.

(57) ABSTRACT

A system and method leverages understanding of complex dribbling video clips by representing a video sequence with a single Dribble Energy Image (DEI) that is informative for dribbling styles recognition. To overcome the shortage of labelled data, a dataset of soccer video clips employs Mask-RCNN to segment out dribbling players and OpenPose to obtain joints information of dribbling players. To solve issues caused by camera motions in highlight soccer videos, the system registers a video sequence to generate a single image representation DEI and dribbling styles classification.

20 Claims, 14 Drawing Sheets

(51) Int. Cl.
*G06N 3/08* (2006.01)
*G06V 40/20* (2022.01)
*G06V 10/82* (2022.01)

(56) References Cited

U.S. PATENT DOCUMENTS

| | | | |
|---|---|---|---|
| 6,430,997 | B1 | 8/2002 | French et al. |
| 6,678,416 | B1* | 1/2004 | Sun .................... G06T 7/251 |
| | | | 382/235 |
| 6,765,726 | B2 | 7/2004 | French et al. |
| 6,876,496 | B2 | 4/2005 | French et al. |
| 7,038,855 | B2 | 5/2006 | French et al. |
| 7,359,121 | B2 | 4/2008 | French et al. |
| 7,791,808 | B2 | 9/2010 | French et al. |
| 8,172,722 | B2 | 5/2012 | Molyneux et al. |
| 8,905,855 | B2 | 12/2014 | Fitzpatrick et al. |
| 9,275,470 | B1* | 3/2016 | Forkosh ................. G06T 7/248 |
| 9,449,230 | B2 | 9/2016 | Han et al. |
| 9,600,717 | B1 | 3/2017 | Dai et al. |
| 10,471,304 | B2 | 11/2019 | Hall |
| 11,087,169 | B2* | 8/2021 | Uchiyama ............ G06V 10/507 |
| 2007/0135225 | A1 | 6/2007 | Nieminen et al. |
| 2018/0053057 | A1* | 2/2018 | De Souza .............. G06V 10/56 |
| 2019/0038952 | A1* | 2/2019 | Spivak ..................... G06T 7/254 |
| 2019/0087661 | A1* | 3/2019 | Lee ........................ G06V 10/25 |
| 2019/0180149 | A1* | 6/2019 | Knittel ..................... G06N 3/04 |
| 2019/0259136 | A1* | 8/2019 | Shpalensky ............ G06V 10/82 |
| 2019/0294871 | A1* | 9/2019 | Vaezi Joze ............ G06V 40/23 |
| 2020/0234480 | A1* | 7/2020 | Volkov .................. G06V 40/171 |
| 2020/0302181 | A1* | 9/2020 | Bhanu ..................... G06V 20/42 |
| 2020/0353311 | A1* | 11/2020 | Ganguly ................. G06V 10/82 |
| 2020/0387817 | A1* | 12/2020 | Kurtz ........................ G06T 7/20 |

OTHER PUBLICATIONS

Cai et al. "Cascade R-CNN: Delving into High Quality Object Detection" CVPR 2017 arXiv:1712.00726 [cs.CV] (Year: 2017).*
Redmon et al. "YOLO9000: Better, Faster, Stronger" CVPR 2016 arXiv:1612.08242 [cs.CV] (Year: 2016).*
Theagarajan et al. "Soccer: Who has the ball? Generating visual analytics and player statistics" in in Proc. IEEE/CVF Conf. Comput. Vis. Pattern Recognit. Workshops (CVPRW), Jun. 2018, pp. 1749-1757. (Year: 2018).*
Li et al. "Fine-Grained Visual Dribbling Style Analysis for Soccer Videos With Augmented Dribble Energy Image", 2019 IEEE/CVF Conference on Computer Vision and Pattern Recognition Workshops (CVPRW), Published Jun. 1, 2019 (Year: 2019).*
Alexei A. Efros, Alexander C. Berg, Greg Mori, and Jitendra Malik. Recognizing action at a distance. In IEEE International Conference on Computer Vision, pp. 726-733, Nice, France, 2003.
Moez Baccouche, Franck Mamalet, Christian Wolf, Christophe Garcia, and Atilla Baskurt. Action classification in soccer videos with long short-term memory recurrent neural networks. In Proceedings of the 20th International Conference on Artificial Neural Networks: Part II, ICANN'10, pp. 154-159, Berlin, Heidelberg, 2010. Springer-Verlag.
Takamasa Tsunoda, Yasuhiro Komori, Masakazu Matsugu, and Tatsuya Harada. Football action recognition using hierarchical lstm. 2017 IEEE Conference on Computer Vision and Pattern Recognition Workshops (CVPRW), pp. 155-163, 2017.
Anthony Cioppa, Adrien Deliege, and Marc Van Droogenbroeck. A bottom-up approach based on semantics for the interpretation of the main camera stream in soccer games. In the IEEE Conference on Computer Vision and Pattern Recognition (CVPR) Workshops, Jun. 2018.
H. Jiang, Y. Lu, and J. Xue. Automatic soccer video event detection based on a deep neural network combined cnn and rnn. In 2016 IEEE 28th International Conference on Tools with Artificial Intelligence (ICTAI), pp. 490-494, Nov. 2016.
Rajkumar Theagarajan, Federico Pala, Xiu Zhang, and Bir Bhanu. Soccer: Who has the ball? generating visual analytics and player statistics. In the IEEE Conference on Computer Vision and Pattern Recognition (CVPR) Workshops, Jun. 2018.
I. J. Goodfellow, Y. Bulatov, J. Ibarz, S. Arnoud, and V. Shet. Multi-digit number recognition from street view imagery using deep convolutional neural networks. In International Conference on Learning Representations, 2014.
Ian Goodfellow, Jean Pouget-Abadie, Mehdi Mirza, Bing Xu, DavidWarde-Farley, Sheijil Ozair, Aaron Courville, and Yoshua Bengio. Generative adversarial nets. In Z. Ghahramani, M. Welling, C. Cortes, N. D. Lawrence, and K. Q. Weinberger, editors, Advances in Neural Information Processing Systems 27, pp. 2672-2680 Curran Associates, Inc., 2014.
A. Li, F. Tang, Y. Guo, and H. Tao. Discriminative nonorthogonal binary subspace tracking, pp. 258-271. Springer, 2010.
W. Abdulla. Mask r-cnn for object detection and instance segmentation on keras and tensorflow. https://github.com/matterport/Mask_RCNN, 2017.
R. Alp Güler, N. Neverova, and I. Kokkinos. Densepose:Dense human pose estimation in the wild. In Proceedings of the IEEE Conference on Computer Vision and Pattern Recognition, pp. 7297-7306, 2018.
C. Bartz, H. Yang, and C. Meinel. See: towards semisupervised end-to-end scene text recognition. In Thirty-Second AAAI Conference on Artificial Intelligence, 2018.
M. Busta, L. Neumann, and J. Matas. Deep textspotter: An end-to-end trainable scene text localization and recognition framework. In Proceedings of the IEEE International Conference on Computer Vision, pp. 2204-2212, 2017.
Z. Cai and N. Vasconcelos. Cascade r-cnn: Delving into high quality object detection. In Proceedings of the IEEE Conference on Computer Vision and Pattern Recognition, pp. 6154-6162, 2018.
Z. Cao, T. Simon, S.-E. Wei, and Y. Sheikh. Realtime multiperson 2d pose estimation using part affinity fields. In Proceedings of the IEEE Conference on Computer Vision and Pattern Recognition, pp. 7291-7299, 2017.
D. Delannay, N. Danhier, and C. D. Vleeschouwer. Detection and recognition of sports(wo)men from multiple views. In ACM/IEEE International Conference on Distributed Smart Cameras (ICDSC), pp. 1-7, Aug. 2009.
A. Dutta, A. Gupta, and A. Zissermann. VGG image annotator (VIA). http://www.robots.ox.ac.uk/˜vgg/software/via/, 2016. Version: 2.0.0, Accessed: Jan. 7, 2018.
S. Gerke, A. Linnemann, and K. Müller. Soccer player recognition using spatial constellation features and jersey number recognition. Computer Vision and Image Understanding, 159:105-115, 2017.
S. Gerke, K. Muller, and R. Schafer. Soccer jersey number recognition using convolutional neural networks. In Proceedings of the IEEE International Conference on Computer Vision Workshops, pp. 17-24, 2015.
R. Girshick. Fast r-cnn. In Proceedings of the IEEE International Conference on Computer Vision, pp. 1440-1448, 2015.
R. Girshick, J. Donahue, T. Darrell, and J. Malik. Regionbased convolutional networks for accurate object detection and segmentation. IEEE Transactions on Pattern Analysis and Machine Intelligence, 38(1):142-158, 2016.
I. J. Goodfellow, Y. Bulatov, J. Ibarz, S. Arnoud, and V. Shet. Multi-digit number recognition from street view imagery using deep convolutional neural networks. In International Conference on Learning Representations, 2014.
K. He, G. Gkioxari, P. Doll'ar, and R. Girshick. Mask rcnn. In Proceedings of the IEEE International Conference an Computer Vision, pp. 2961-2969, 2017.
K. He, X. Zhang, S. Ren, and J. Sun. Deep residual learning for image recognition. In Proceedings of the IEEE Conference on Computer Vision and Pattern Recognition, pp. 770-778,2016.
M. Jaderberg, K. Simonyan, A. Vedaldi, and A. Zisserman. Reading text in the wild with convolutional neural networks. International Journal of Computer Vision, 116(1):1-20, 2016.
M. Jaderberg, K. Simonyan, A. Zisserman, and K. Kavukcuoglu. Spatial transformer networks. In Advances in Neural Information Processing Systems 28, pp. 2017-2025, 2015.

(56) References Cited

OTHER PUBLICATIONS

G. Li, S. Xu, X. Liu, L. Li, and C. Wang. Jersey number recognition with semi-supervised spatial transformer network. In Proceedings of the IEEE Conference on Computer Vision and Pattern Recognition Workshops, pp. 1783-1790, 2018.
T.-Y. Lin, P. Doll'ar, R. Girshick, K. He, B. Hariharan, and S. Belongie. Feature pyramid networks for object detection. In Proceedings of the IEEE Conference on Computer Vision and Pattern Recognition, pp. 2117-2125, 2017.
T.-Y. Lin, M. Maire, S. Belongie, J. Hays, P. Perona, D. Ramanan, P. Doll'ar, and C. L. Zitnick. Microsoft coco: Common objects in context. In European Conference on Computer Vision, pp. 740-755. Springer, 2014.
C.-W. Lu, C.-Y. Lin, C.-Y. Hsu, M.-F. Weng, L.-W. Kang, and H.-Y. M. Liao. Identification and tracking of players in sport videos. In Proceedings of the Fifth International Conference on Internet Multimedia Computing and Service, pp. 113-116. ACM, 2013.
W.-L. Lu, J.-A. Ting, J. J. Little, and K. P. Murphy. Learning to track and identify players from broadcast sports videos. IEEE Transactions on Pattern Analysis and Machine Intelligence, 35(7):1704-1716, 2013.
W.-L. Lu, J.-A. Ting, K. Murphy, and J. Little. Identifying players in broadcast sports videos using conditional random fields. In Proceedings of the 2011 IEEE Conference on Computer Vision and Pattern Recognition, pp. 3249-3256. IEEE Computer Society, 2011.
J. Ma, W. Shao, H. Ye, L. Wang, H. Wang, Y. Zheng, and X. Xue. Arbitrary-oriented scene text detection via rotation proposals. IEEE Transactions on Multimedia, 20(11):3111-3122, 2018.
A. Y. Ng. Feature selection, l1 vs. l2 regularization, and rotational invariance. In Proceedings of the Twenty-first International Conference on Machine Learning, p. 78. ACM, 2004.
J. Poignant, L. Besacier, G. Quenot, and F. Thollard. From text detection in videos to person identification. In Proceedings of the 2012 IEEE International Conference on Multimedia and Expo, pp. 854-859. IEEE Computer Society, 2012.
S. Ren, K. He, R. Girshick, and J. Sun. Faster r-cnn: towards real-time object detection with region proposal networks. In Advances in Neural Information Processing Systems 28, pp. 91-99, 2015.
M. Šari, H. Dujmi, V. Papi, and N. Roži. Player number localization and recognition in soccer video using hsv color space and internal contours. In The International Conference on Signal and Image Processing (ICSIP 2008), 2008.
A. Senocak, T.-H. O. J. Kim, and I. S. Kweon. Part-based player identification using deep convolutional representationand multi-scale pooling. In Proceedings of the IEEE Conference on Computer Vision and Pattern Recognition Workshops, pp. 1732-1739, 2018.
B. Shi, X. Wang, P. Lyu, C. Yao, and X. Bai. Robust scene text recognition with automatic rectification. In Proceedings of the IEEE Conference on Computer Vision and Pattern Recognition, pp. 4168-4176, 2016.
K. Simonyan and A. Zisserman. Very deep convolutional networks for large-scale image recognition. In International Conference on Learning Representations, 2015.
D. B. West et al. Introduction to graph theory, vol. 2. Prentice hall Upper Saddle River, NJ, 1996. Retrieved by Examiner from https://athena.nitc.ac.in/summerschool/Files/West.pdf.
S. Xie, R. Girshick, P. Doll'ar, Z. Tu, and K. He. Aggregated residual transformations for deep neural networks. In Proceedings of the IEEE Conference on Computer Vision and Pattern Recognition, pp. 1492-1500, 2017.
Q. Ye, Q. Huang, S. Jiang, Y. Liu, and W. Gao. Jersey number detection in sports video for athlete identification. In Visual Communications and Image Processing, vol. 5960, pp. 1599-1606, 2005.

\* cited by examiner

Figure 21A
Figure 21B
(a) Localization without grid based resizing
(b) Localization with grid based resizing
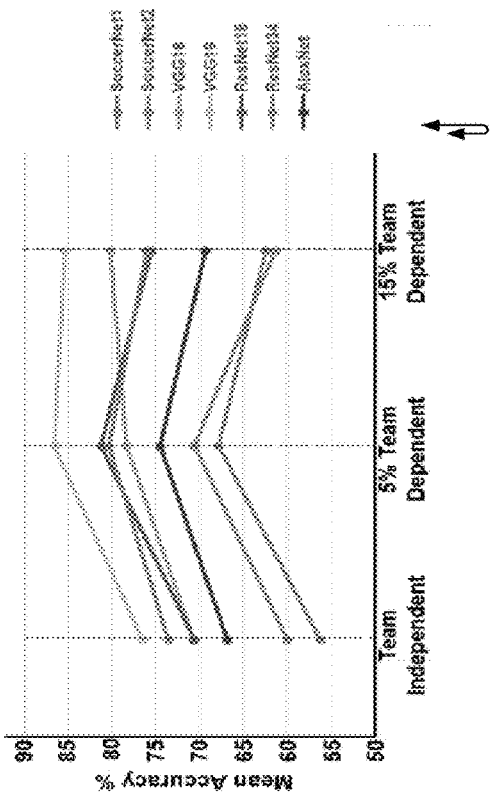
Figure 22

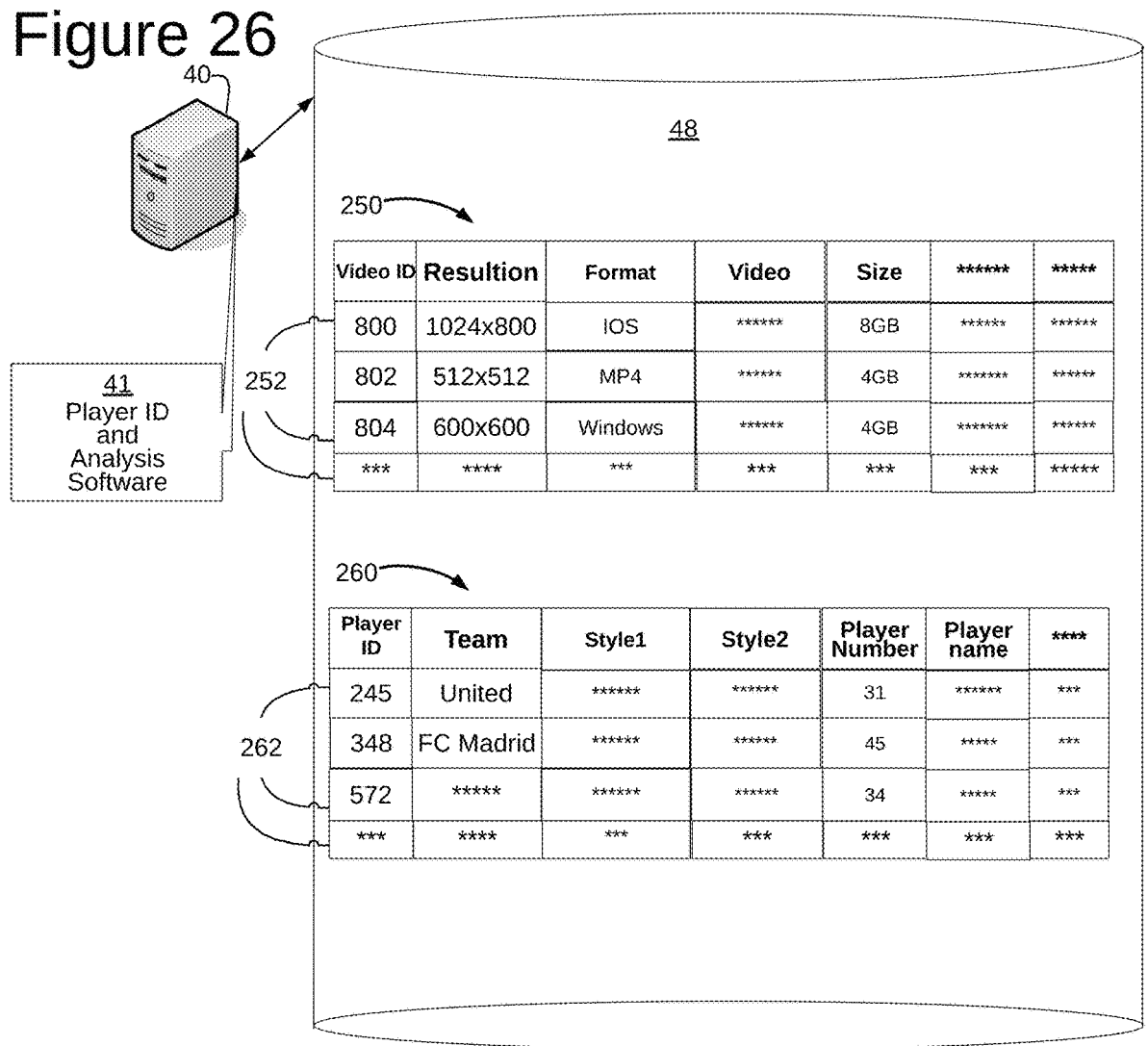

ATHLETE STYLE RECOGNITION SYSTEM AND METHOD

RELATED APPLICATION DATA

This application claims the benefit of U.S. Provisional Application Ser. No. 62/862,578, entitled "Athlete Style Recognition System And Method", filed Jun. 17, 2019, which is incorporated by reference.

FIELD OF THE INVENTION

The invention relates to an athlete style recognition system and method. More specifically, the system and method are used for recognizing athletic player styles in a sports game for analyzing and recognizing a player's disadvantages and limitations.

BACKGROUND OF THE INVENTION

Broadcast sports are one of the most watched and studied forms of videos in the World. Game analysis is performed in real time by professional commentators and which are often recorded for coaching purposes. Human analysis requires the review of thousands of hours of footage over the course of a season and requires tasks that are impractical to be performed by human observers.

Computer vision has been employed in sports analysis for broadcasting usage and commercial application. Techniques connected with player identification, action recognition and score prediction are critical scenarios in baseball, soccer, ice hockey, etc. Using soccer, or European football, in Europe, five top football leagues, Premier League, La Liga, Championnat de France de football Ligue 1, Bundesliga and Lega Serie A, organize the highest-level soccer games every year and attract soccer players around the world to participate. Among those, Premier League is the most profitable league, which achieved a revenue of 5297 million pounds in 2016-2017. The booming business value in soccer drives deeper analysis targeting on players, coaches, tactics, etc., to obtain precise and elaborate statistics of every soccer player and match.

Investigating dribbling skills in soccer games is beneficial to both clubs, in a competition, to train their players, and for defenders to know how to improve defending skills. For example, top players, such as Cristiano Ronaldo, Lionel Messi and Neymar Jr., are well-known as icons for their smart dribbling skills, which help them evade and dribble through defenders and score in soccer games. Soccer fans are constantly amazed by adept dribbling skills and are curious to understand and analyze their styles when they watch top-class soccer games such as the World Cup, UEFA European Champions, and the like.

With reference to FIG. 1, typically, soccer games are recorded with cameras distributed around the soccer field recording player movements far from camera view and in small scale. These kinds of videos can be utilized by coaches and players to study tactics of different soccer teams according to the positions of players. There are also highlight videos captured in close-view to players where the camera is moving to track players who are controlling the ball and performing various tasks that may require significant skills. These videos illustrate expert skills in soccer games and they are shared by fans around the world. However, in soccer video analysis, the main challenge is the lack of labelled data in both overview videos and highlight videos. Even if highlight videos are captured, another issue is the camera calibration in tracking and capturing players who are performing smart movements. Players move at a super-fast speed and cameras also are trying to catch up with players, causing camera motion. A sequence of frames with both temporal and spatial information will be affected and thus can provide little information without image registration. The fact is that a massive amount of data is available to that does not have corresponding camera parameters for calibration.

Computer vision already plays a key role in sport analysis ranging from basketball, soccer, baseball and ice hockey based on large amounts of streaming data. They produce statistics of events in a game by either having humans analyze videos captured by cameras or captured semantic data.

Research is increasingly focused on soccer video analysis including video summarization, event classification and action recognition. Efros et al. recognized actions at a distance in soccer matches by introducing a motion descriptor based on optical flow in a spatiotemporal volume for each human figure. Baccouche et al. proposed an approach for 4-classes action classification in soccer videos using a recurrent neural network. Tsunoda et ad. proposed a hierarchical-LSTMs to conduct action recognition involving "Dribble", "Shoot" and "Pass" actions in fustal and their dataset was collected by 14 calibrated and synchronized cameras distributed in a futsal field. Cioppa et al. proposed a bottom-up approach to interpret soccer games captured by the main camera stream. Their method extracted features from soccer videos and corresponding features with semantic meanings for better events understanding in soccer games. Jiang et al. employed the CNN for feature extractions and combined RNN to emphasize temporal information to detect events in soccer videos. Theagarajan et al. conducted soccer analysis for identifying players who has the ball in soccer matches by using convolutional neural network and GAN for data augmentation.

Part of the problem in the prior art concerns recognizing players as a first step. The problem can be considered as the combination of person identification and digit recognition in the context of sports broadcast videos. Traditional approaches before the dominance of deep learning usually involved an optical character recognition (OCR) system then classification of numbers based on segmentation results. Sari et al. introduced a complete OCR system to segment images in HSV color space with heavy pre-processing and post-processing. Ye et al. combined tracking information of frames and an OCR system to predict jersey number based on voting. Lu et al. takes the person localizations of deformable part model (DPM) detector then performs OCR and classification with matching templates. These OCR-based methods have limited flexibility and robustness dealing with larger datasets. Switching to deep learning approaches, Gerke designs a neural network for jersey number recognition on small number-centered jersey images. A recent work from Li et al. embed Spatial Transformer Network (STN) modules into a CNN architecture to localize jersey number more precisely and trains the network with additional manually-labeled transformation quadrangles in a semi-supervised fashion.

Some works take the sports field into consideration. De-lannay et al. formulates ground plane occupancy maps from multi-views detection to perform localization, followed by an OCR system and multi-class support vector machine (SVM). Gerke et al. considers the player recognition problem as a classifier fusion of players' positional features and jersey number convolutional neural network (CNN) ones. These works put strong assumptions on the hidden pattern of player's movement and mapping of real-world and image coordinates of players. These assumptions are neither well-constructed nor universal applicable.

The jersey number recognition problem can be formulated as person re-identification (ReID) as well. Some approaches favor performing player identification directly. Lu et al. uses handcrafted combination of features to create a player representation model, then builds a L1-regularized logistic regression classifier for classification, and a conditional random field (CRF) graphical model to predict unlabeled videos. Lu et al. introduces homography estimation and a weakly-supervised learning to reduce the labor of manual annotation via auxiliary text log information of game matches. Senocak et al. tackles the player identification problem by constructing a fused feature of multi-scale features extracted from whole body image and pooled features from body parts.

Similarly, Poignant et al. describes a video OCR system for text recognition combing audio information to perform person identification. Goodfellow et al. addresses number sequences recognition in constrained natural images with deep neural networks. Jaderberg et al. uses a complete text recognition system for natural scene images with heavily-engineered framework. STNs are used for natural scene text detection and recognition. Busta et al. modify a region proposal network (RPN) with rotation capability for better text localization. The above-mentioned literature addresses the issue of scene text being in irregular shapes which is also common but more complicated in jersey recognition problem. Jersey numbers are often distorted by player pose deformations and fast motion blur. Li et al. adopts STN modules in the hope of improving localization and rectifying number distortion. However, the success of STN is built upon the fact of there being only one jersey number per image in their dataset. it is not applicable for complex scenes with more people.

As for R-CNN based approaches, with the successes of R-CNNs, object detection and classification are unified with high practicality. Mask R-CNN and Faster R-CNN are built upon RPNs with pre-defined anchors to generate region proposals, then the features are pooled and fed into regression and classification heads. Vanilla RPN has 3 scales and 3 ratios for each anchor. Ma et al. extended the anchor design with a rotation parameter for better text proposal alignment. Cai et al. introduced a multi-stage Cascade R-CNN to address the issue of degraded detection performance when increasing intersection-over-union (IoU) threshold.

The main concern of recognition problem in nature scenes is: how to get robust region proposals.

Thus, there is a need for system and method that are able to take this massive amount of data and corresponding camera parameters for calibration to allow for player style analysis. There is a further need for and system and method to recognize dribbling styles of a player who is controlling the ball and performing smart dribbling actions. There is still a further need for a system and method for fine-grained dribbling styles classification from video clips with different resolutions.

There is also a further need for automation of analysis in which tasks such as player detection, tracking, identification, as well as generation of game synopses, is automated using computer vision algorithms to gather comprehensive sports match information without ever having to watch a minute of game video.

There is yet a further need for a system that automatically generates visual analytics from sports videos to help coaches and recruiters identify the most promising talent.

SUMMARY OF THE INVENTION

To solve shortcomings of the systems and methods described above, the system and method is able to use collected highlights of video clips, for example, from YouTube®, which involve different player skills, such as dribbling skills performed by professional soccer players, in both real games, and simulated game environments, such as FIFA and PEPS games on Xbox, PlayStation and tutorial video clips provided by soccer fans. Deep neural network modules are trained on large-scale image datasets which are used to localize and segment soccer players in every frame in each video clip.

In one embodiment, an affine-transformation-based module is used to register a sequence of frames with target dribbling players into a single image representation, referred to herein as Dribble Energy Image (DEI). Finally, a neural network trained to classify dribbling styles and conditional generative adversarial network (GAN) with constraints on body posture is employed for data augmentation. Some of the main steps include:

- Collecting and building up a soccer dribbling dataset involving data with variants from multiple sources.
- Introducing Dribble Energy Image (DEI) to transfer a sequence of frames to an image representation using an affine-transformation-based image registration method, which can handle raw video clips at multi-scale resolutions and solve camera motion problems.
- Classifying soccer dribbling styles using a convolutional neural network and training a generative adversarial network (GAN) to augment datasets for improving the classification performance.
- Constructing a dribbling player's joints model as probability conditions for training conditional GAN to generate DEI wherein objects are guided to follow the embedding of a soccer player's body.

In one embodiment, to perform soccer video analysis, tracking, recognizing and identifying players are the initial steps. Soccer players can be detected and extracted using object detection techniques. Girshick proposed the Fast R-CNN for detecting objects (persons) and this work was optimized to the Mask R-CNN. However, occlusions on players makes it a challenging task to detect players in soccer games and dribbling actions are invisible due to occlusions. After detecting the soccer players in each frame, the system extracts the 2D pose information of each player using OpenPose described by Zhe Cao, Tomas Simon, Shih-En Wei, and Yaser Sheikh. Realtime multi-person 2d pose estimation using part affinity fields, in *CVPR*, 2017.

BRIEF DESCRIPTION OF THE DRAWINGS

FIG. 21A and FIG. 21B show an example of soccer player detection without and with grid-based resizing;

FIG. 22 is a graph showing the mean accuracy obtained using the individual networks for the team dependent and team independent setting;

FIG. 26, an overview of the processor and database system.

DETAILED DESCRIPTION OF THE PREFERRED EMBODIMENTS

Figure 1:
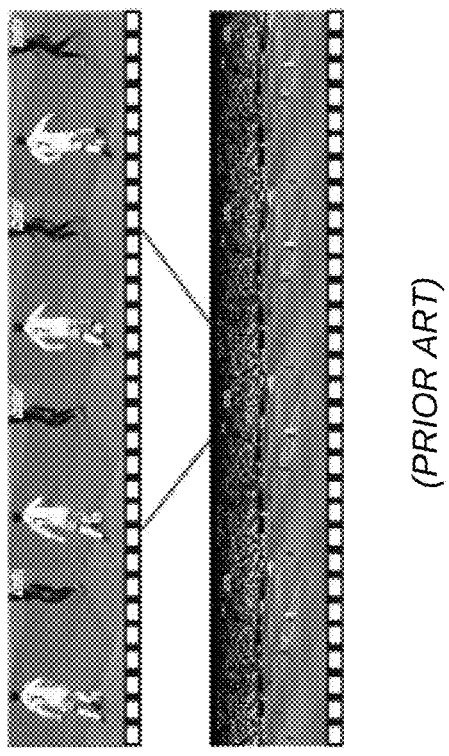
FIG. 1 is an image from a prior art recording of a soccer game.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

I. Athlete Style Recognition

The system for athlete style recognition is disclosed in accordance with preferred embodiments of the present invention is illustrated in FIGS. 1-26 wherein like reference numerals are used throughout to designate like elements.

Figure 2:
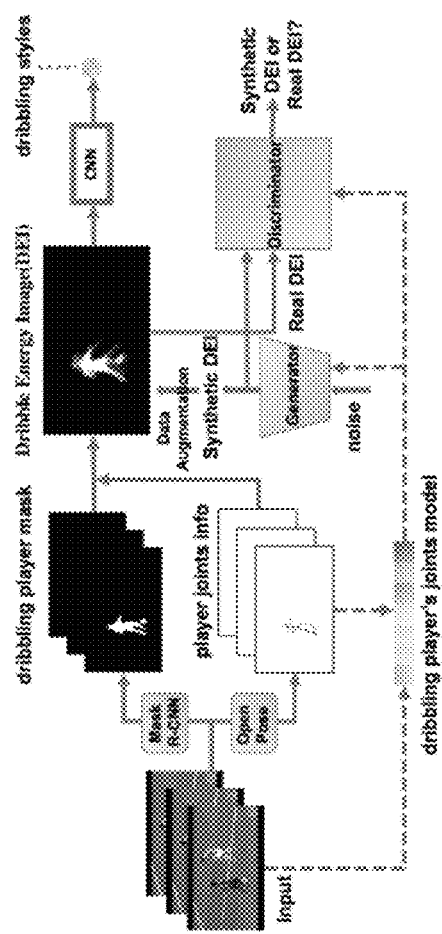
FIG. 2 is a diagrammatic overview of one embodiment of a system for player identification and analysis.

With reference to FIG. 2 a diagrammatic overview of one embodiment is shown. The system comprises modules for a dribbling player's segmentation, pose detection, body parts, image registration, data augmentation and dribbling styles classification modules.

Dribbling Player Segmentation

Referring to FIG. 2, the system employs Mask R-CNN to localize and segment players who are performing dribbling skills from each frame in every video sequence. The Mask R-CNN extends the Faster R-CNN and adopts a two-stage procedure, which predicts not only the class label and bounding box of an object, but also a binary mask of each ROI in parallel. In one embodiment, the procedure used is pre-trained on the Microsoft COCO dataset involving classes such as, for example, persons and sports ball, which are dominant targets in soccer. The system processes every frame of each video clip through Mask R-CNN. In each frame, the system only keeps the masks of the player who is dribbling and the soccer ball. The processing time of Mask R-CNN is, for example, in one embodiment, 3.79 seconds/frame using one NVIDIA GPU at a resolution of 480×854. Images of higher resolutions require more processing time.

Figure 3:
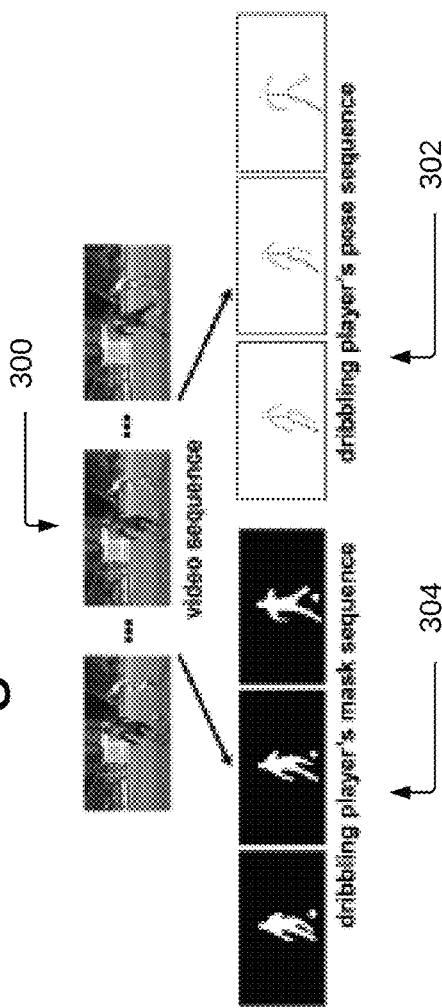
FIG. 3 is a video sequence of dribbling actions performed by Cristiano Ronaldo is shown in the top portion.

With reference to FIG. 3, a video sequence of dribbling actions performed by Cristiano Ronaldo is shown in the top portion 300. In the bottom right, a pose of a dribbling player in the video sequence 302 is sown. The bottom left part in FIG. 3 shows the mask results of the dribbling player on a video sequence 304 using Mask R-CNN.

Dribbling Player Pose Detection

After localizing and segmenting visual soccer players in the video sequence, in one embodiment, the system may use OpenPose to extract 2D pose information of target soccer players. OpenPose takes a color image of size w×h as the input and produces the 2D locations of anatomical keypoints for each person in the image as the output. In one embodiment, the system may use a pose described with 25 keypoints pre-trained on a Microsoft COCO dataset. For every frame of each video clip, the system may use OpenPose to obtain key-points of soccer players with mask of soccer players obtained from Mask R-CNN and the system only use coordinates of joints of the only one player who is performing the dribbling action. The processing time of Openpose, may be, for example, 0.1825 seconds/frame using one NVIDIA GPU with the resolution of 720×1080. The bottom right part of FIG. 3 illustrates a detected pose of the dribbling player in a video sequence 302 using OpenPose.

Dribbling Player Image Registration

As dribbling actions are performed in a sequence of frames by soccer players, it causes spatial motions of objects within each frame and camera motions across consecutive images. Most of current work processes a sequence of frames in a spatial stream, a temporal stream, and combines the two streams, which requires massive computations in both time and memory. One prior system introduced a dynamic image which is a standard RGB image that summarizes the appearance and dynamics of a whole video sequence so that it can be used for action recognition. Another prior system proposed using a Gait Energy Image as a spatial temporal gait representation for human walking recognition. One prior system proposed using binary motion-energy image (MEI) to represent where motion has occurred in an image sequence and motion-history image (MHI), which is a scalar-valued image where intensity is a function of motion.

The system described herein implements frame registration to solve the motion caused by the dribbling player and the camera. The dribble energy image encodes the spatial-temporal information of a video sequence into a single image, which enables CNN to be trained and tested in a faster and easier way. To eliminate influences imposed by camera motions, the system uses the hip-joint-based and the affine-transformation-based registration methods to transform a sequence of frames into the same embedding so as to generate a single image representation for each dribbling video clip.

Hip-Joint-Based Image Registration

Figure 4:
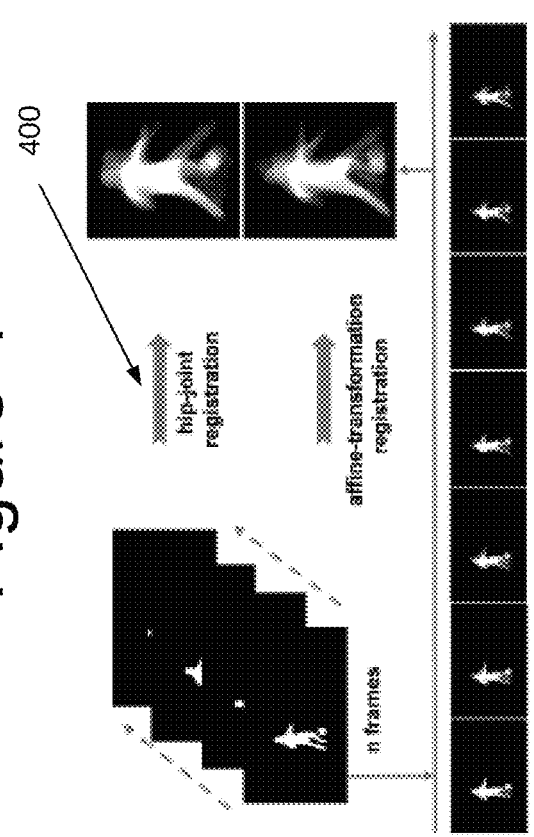
FIG. 4 is a sample image registration results for DEI and intermediate registration results.

When watching soccer players moving and performing dribbling actions, it is system recognized that the hip area around the player's body is relatively static in reference to whole body and lower torso mainly supports movements of the body. Based on this observation, the system makes the assumption that image registration across a sequence of frames can be done by taking the hip joint of soccer player as the reference. Therefore, the system embeds the mask image sequence to generate one energy image according to the coordinate of the hip joint of the dribbling player in the video sequence. With reference to FIG. 4, a sample image registration results for DEI and an intermediate registration results by applying an affine-transformation-based method gradually on a video sequence is shown. The right side of the upper branch in FIG. 4 illustrates the result using hip-joint-based image registration method 400.

Affine-transformation-based image registration

Figure 5:
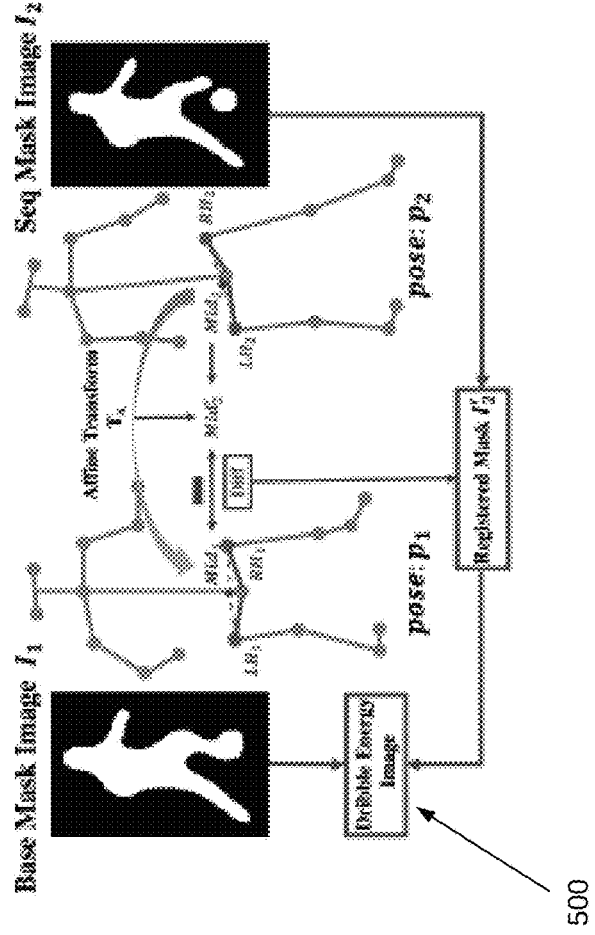
FIG. 5 is an affine-transformation-based image registration for DEI.

With reference to FIG. 5, an affine-transformation-based image registration for DEI is shown. The left side of FIG. 5 illustrates key-points of the dribbling player bounded by base mask image. The affine-transformation-based method is used for DEI 500 for better registration results and the process is illustrated in FIG. 5. As described above, a sequence of mask images $I_j$, $j \in 1,2,3, \ldots, n$ containing the dribbling player from every video clip $V_i$, $i \in 1,2,3, \ldots, N$. Meanwhile, in each mask image, the pose information with 25 key-points is bounded with the target dribbling player. Then the system may take the first mask image as the base mask image and highlight the left hip ($LH_1$) and right hip ($RH_1$) coordinates of the dribbling player, described as ($x_{lb}^1$, $y_{lb}^1$) and ($x_{rb}^1$, $y_{rb}^1$) along (x, y) axes, respectively. The system also names each image $I_j$, $j \in 2, 3, \ldots, n$ as the sequence mask image starting from the second mask image. To conduct image registration, the system takes the second sequence mask image has an example, firstly, the system localizes left hip ($LH_1$) and right hip ($RH_2$) coordinates of the target dribbling player, described as ($x_{ls}^2$, $y_{ls}^2$) and ($x_{rs}^2$, $y_{rs}^2$) respectively. Preferably, the system aligns the sequence mask image $I_2$ according to the middle points ($Mid_1$ and $Mid_2$ in FIG. 5) in the line connected by [$LH_1$, $RH_1$] and [$LH_2$, $RH_2$], which are ($x_{lb}^1$, $y_{lb}^1$), ($x_{rb}^1$, $y_{rb}^1$)] and ($x_{ls}^2$, $y_{ls}^2$), ($x_{rs}^2$, $y_{rs}^2$)] in FIG. 5, respectively. Therefore, in each sequence mask image $I_j$, $j \in 2, 3, \ldots, n$ the system preferably aligns the midpoint $Mid_j$, $j \in 2, 3, \ldots, n$ to $Mid'_j$, $j \in 1,2, 3, \ldots, n$ using the transformation matrix $T_A$ described by equation (1) below. Then the system calculates distance between aligned middle point $Mid_j$, $j \in 2, 3, \ldots, n$ and middle point in base mask image $Mid_1$ and register each sequence mask image on the base mask image to generate DEI.

$$Mid'_j = T_A \times Mid_j, j \in 2,3, \ldots, n \quad (1)$$

The system calculates affine transformation for the transformation matrix $T_A$ using every pair of the sequence mask image and the base mask image. Considering how the system processes the sequence mask image $I_2$ as an example, the system finds a point ($\hat{x}^1, \hat{y}^1$) in base mask image $I_1$ to construct the equilateral triangle among three points, ($x_{lb}^1$, $y_{lb}^1$), ($x_{rb}^1$, $y_{rb}^1$) and ($\hat{x}^1, \hat{y}^1$). Following the same way, in the sequence mask image $I_2$, the system finds a point ($\hat{x}^2, \hat{y}^2$) to construct an equilateral triangle among three points, ($x_{ls}^2$, $y_{ls}^2$), ($x_{rs}^2, y_{rs}^2$) and ($\hat{x}^2, \hat{y}^2$). Then, the system calculates the affine transformation using these two sets of three-points reference equation (2) below. In equation (2), ($x_1$, $y_1$) is the end point from equilateral triangle in the base mask image and ($x_2$, $y_2$) is the end point from equilateral triangle in the sequence mask image.

$$\begin{bmatrix} x_1 \\ y_1 \\ 1 \end{bmatrix} = \begin{bmatrix} a & b & c \\ d & e & f \end{bmatrix} \times \begin{bmatrix} x_2 \\ y_2 \\ 1 \end{bmatrix} \quad (2)$$

The affine-transformation-based registration method is shown in FIG. 5. The DEI of affine-transformation-based method is illustrated on the right side of top branch in FIG. 4. The intermediate registration results of applying affine-transformation-based method gradually across a video sequence are presented in bottom in FIG. 4.

Dribbling Styles Classification via Convolutional Neural Network

To classify dribbling styles using DEIs, the system uses a convolutional neural network (CNN) to perform training and testing. Embodiments of networks that can be used include AlexNet, VGG-16 and ResNet18. The system may split the dataset comprising the DEIs into training and testing datasets respectively. The system may train the model with the training dataset in which each image is resized to 224×224. A mini-batch size is selected to train the network and during every epoch, the training data is randomly shuffled. The training session is terminated when loss coverages are observed to avoid over-fitting problems.

Dataset Augmentation Via Generative Adversarial Network

In one embodiment, use of a generative adversarial network (GAN) has advantages in image generation, translation, animation, and the like. Further improvements may be made by employing convolutional layers, and batch normalization layers of a deep neural network in both generator and discriminator to create an architecture called DCGAN. Another method includes applying a conditional generative adversarial network (cGAN) by giving a conditional vector along with the random noise to the generator and to the discriminator together with an image.

To solve the shortage of soccer videos with dribbling actions, the system may employ DCGAN for data augmentation to a training dataset. The purpose of data augmentation is to determine whether generating more variability to the training dataset can help to improve the performance of the system.

Dataset Augmentation via DCGAN

A deep convolutional generative adversarial network (DCGAN) may be trained for data augmentation. DCGAN contains two deep convolutional neural networks, one generator and one discriminator. The generator will accept a random noise vector z and output an image by learning the mapping of data space as $I_z = G(z; \theta_g)$. The discriminator accepts a real or a generated image alternately and outputs a probability of which sources the input image is from. The discriminator is trained to maximize the probability log D(x) of identifying correct labels to both training images and images generated from generator. Also, the generator is trained simultaneously to minimize log(1−D (G(z))). In one embodiment, the system proceeds by replacing pooling layers with convolutional layers in both the generator and discriminator and using batch normalization and Leaky ReLU as the activation function. The DCGAN is trained to generate DEIs for usage in the training dataset.

Dribbling Player Joints Model Reasoned GAN

Figure 6:
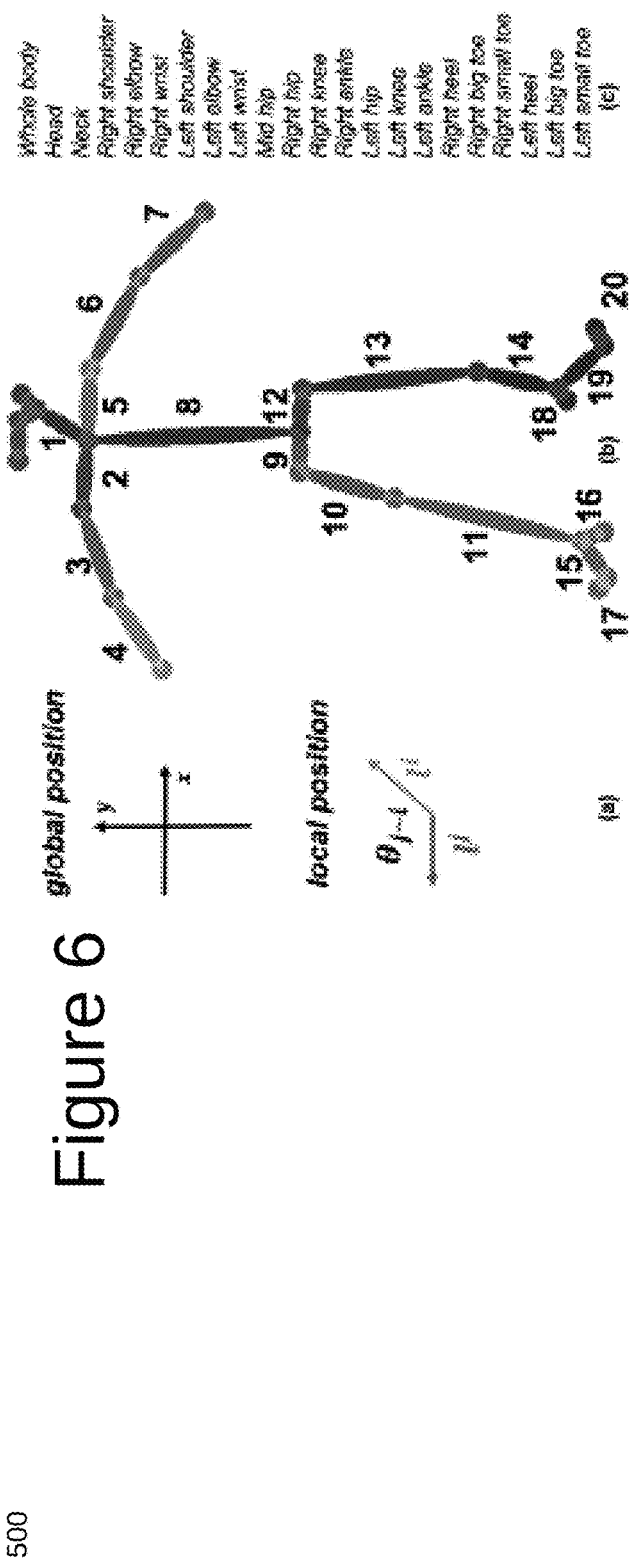
FIG. 6 is a soccer dribbling player joints model.

To reason how different poses of soccer players perform during dribbling actions in soccer games, the system builds the dribbling player's joints model based on joints information obtained from OpenPose. With reference to FIG. 6, a soccer dribbling player joints model is shown, including (a) a global position in coordinate system and local position between adjacent joints, and (b) & (c) limb segments in soccer players. As illustrated in FIG. 6, each body segment, i, is approximated by a 2D limb with parameter $l^i$: the limb length. The main body is defined via joints, neck and mid-hip, which are used to calculate the global position. The articulated structure of the dribbling player body has a total of 41 degrees of freedom (DOFs) with two descriptions: global position and local position. The global position is described by the angle of the torso formed by the neck and the mid-hip within the Cartesian coordinate system, as $g=\theta°$. The local position is calculated for each limb length and joints angle as l and θ:

$$I=[l^i], i=1,\ldots,20 \quad (3)$$

$$\theta=[\theta^j], j=1,\ldots,20 \quad (4)$$

For local position, as shown in FIG. 6, the system calculates 20 limb lengths and normalizes them. The system calculates 20 angles between each pair of adjacent joints. For example, in FIG. 6 part (a), angle $\theta_{j-i}$ is calculated for limb $l_j$ and $l_i$. The system concatenates each angle after the limb length to form a 41 DOFs vector $[I, g\theta]^T$ to the describe dribbling pose of soccer players.

Figure 7:
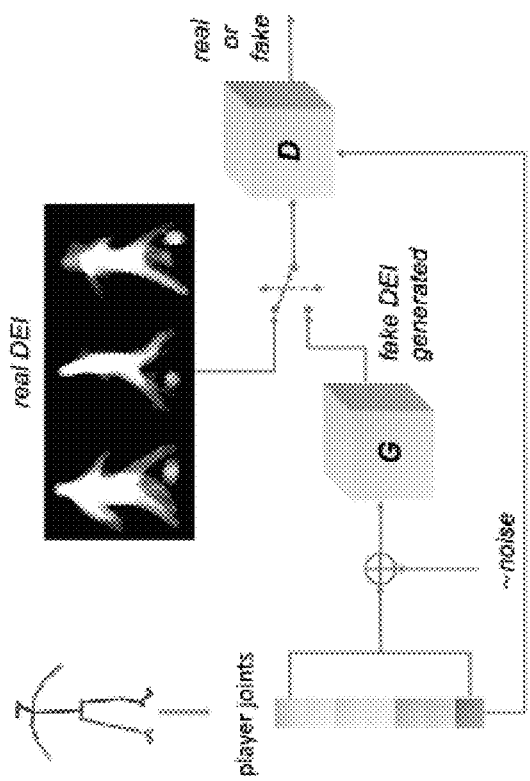
FIG. 7 is an architecture and data flow for a dribbling player joints model.

For each dribbling style, the system calculates the mean of players' joints model as the condition vector. The system gives the conditional vector to both the generator and discriminator and uses the conditional-GAN to generate DEIs of different dribbling styles. The dribbling players joints model guides and formalizes the result from the generator to be within the embedding of the soccer player. Therefore, the dribbling players joints model works as the prior condition for the generator to learn data mapping, and loss function will also help the generator to refine data mapping it has learned. With reference to FIG. 7, the architecture and data flow for a dribbling player joints model used with conditional-GAN is shown.

Experiments Results

Evaluation may be performed with the dataset collected. PyTorch may be used on a workstation with 4 NVIDIA 1080-Ti GPUs.

Dataset

Figure 8:
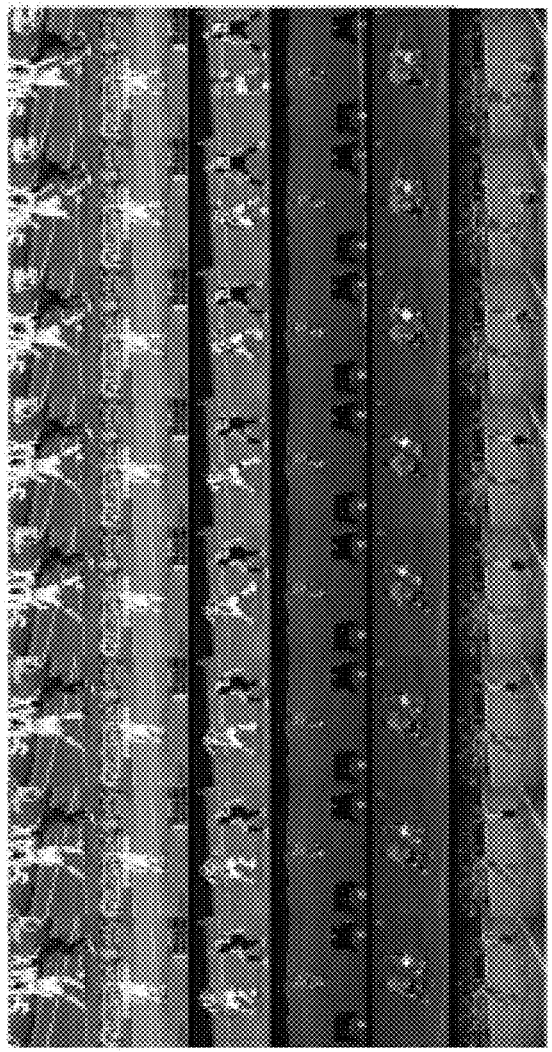
FIG. 8 is an illustration of examples in a dataset.
Figure 9:
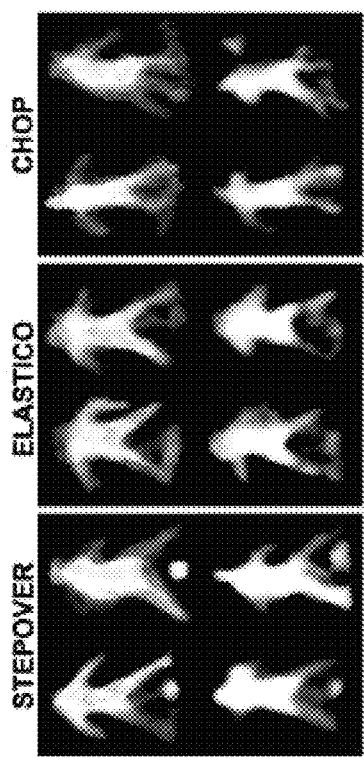
FIG. 9 is an illustration of generated DEIs.
Figure 10:
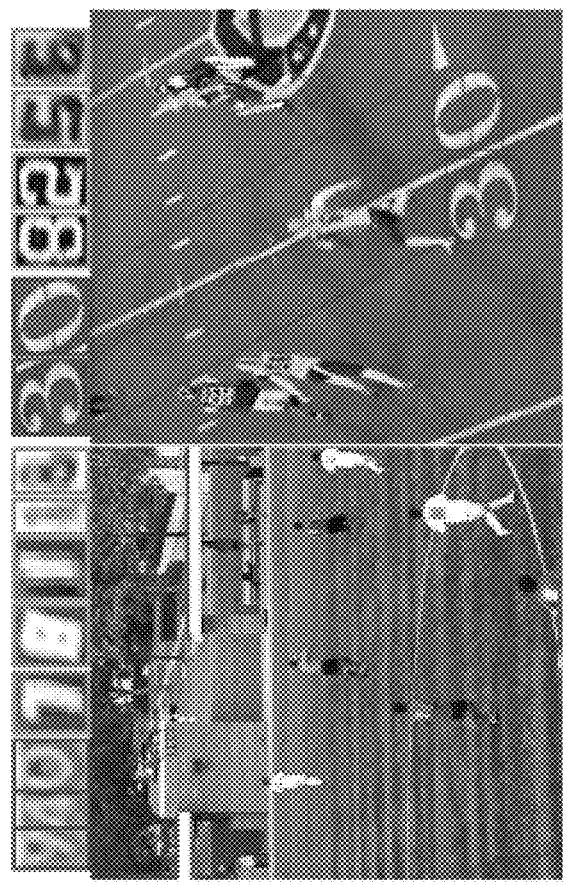
FIG. 10 is a sample video image showing illumination conditions.

A dataset is collected by searching and crawling on YouTube®. Highlights of soccer videos are focused on to cut a long highlight video into pieces with dribbling actions. After downloading videos from YouTube®, each video is clipped into tiny video clips and each video clip contains one dribbling style. In total, the dataset may comprise, for example, 313 video clips with more than 6400 frames and each video clip is annotated with the corresponding dribbling style name: STEPOVER, ELASTICO and CHOP. Dribbling styles annotations are terminologies used in soccer games. The STEPOVER is the style where soccer players will use their non-dominant foot to pretend kicking the ball to one direction but go over the ball in actual to evade defenders. The ELASTICO is the style where soccer players use outside of their dominant foot to push the ball to one direction, then change to move to reverse direction with ball. The CHOP is the style where soccer players use one foot to kick the ball to the reverse direction behind their body. Table 1 shows basic statistics of the dataset and FIG. 8 shows examples in the dataset. The dataset may be setup with following features:

- Dribbling players in the dataset are from almost all top clubs from 5 top leagues in Europe and there are more than 55 players identities with dribbling actions, including female players.
- Dataset contains data from synthetic games, FIFA on Xbox One and PlayStation which are vivid as real data.
- Data is in high resolution; 143 video clips are in 1080× 1920 and 96 clips are in 720×1920.

TABLE 1

Soccer Dribbling Dataset Statistics.

| Dribbling Styles | STEPOVER | ELASTICO | CHOP |
|---|---|---|---|
| Total clips | 123 | 81 | 110 |
| Total frames | 1434 | 2301 | 2696 |
| Average # of frames | 11.6 | 28.4 | 24.5 |
| Teams | 14 | 11+ | 25+ |
| Number of Players | 16 | 21 | 50+ |

Dribbling Styles Classification

In this section, dribbling styles classification results obtained using the system are presented, and classification results on several main-stream architectures are compared using DEIs generated from two methods separately. For each video clip, each frame is processed with Mask R-CNN and OpenPose. Then two image registration methods are used to generate the DEI on each video sequence. DEIs are used as representations of video clips in which soccer players are performing dribbling actions to perform dribbling styles classification with convolutional neural networks. 216 video clips which are initially collected for training are used and 59 video clips for testing with 5-fold cross validation mechanism are used. From Table 2, it is shown that using transformation-based DEIs on ResNet-18 achieves the best performance, this method servers as the baseline.

TABLE 2

Soccer Dribbling Styles Classification Results.

| Method | Mean Accuracy | STDEV. |
|---|---|---|
| Hip*_AlexNet[15] | 85.24% | 0.31% |
| Affine*_AlexNet[15] | 87.8% | 2.2% |
| Affine_VGG-15[21] | 83.73% | 4.08% |
| Affine_ResNet-18[10] | 88.14% | 3.17% |

*Hip and *Affine: registration methods.

Data Augmentation

This section describes one way to implement and observe how augmenting dataset affects the performance of the task by training the DCGAN model and players-joints-model-reasoned Conditional-GAN model, respectively.

To train the DCGAN, the generator may be designed to accept a 1×100 noise vector which is randomly sampled from a normal distribution. The output of generator may be a grayscale image of size 64×64. The discriminator accepts a grayscale image of size 64×64 from either real images or generated images as input and predicts whether the image is real or generated by the generator. The DCGAN may be trained with a learning rate of $2\times10^{-4}$ and a mini-batch size of 18. The system may optimize both the generator and discriminator using the Adam optimization and Binary Cross Entropy loss function. Generated DEIs are shown in the top row in FIG. 9.

For a conditional GAN reasoned by dribbling player's joints model, the dribbling players joints model is focused on as the vector mentioned above to random noise as the input to the generator. The random noise is generated in 1×100 dimensions from a normal distribution. The output of the generator is a grayscale image of size 64×64. To train the discriminator, a grayscale image is given from either real images or generated images alternatively of size 64×64 as the input. The dribbling player joint model is focused on as the vector with the last layer of discriminator and discriminator predicts whether the input image is the real or the generated. The system is trained with similar mechanism as described in Alec Radford, Luke Metz, and Soumith Chintala. Unsupervised representation learning with deep convolutional generative adversarial networks. *CoRR*, abs/1511.06434, 2015. Generated DEIs are shown in the bottom row in FIG. 9. From FIG. 9, it is shown that using DCGAN can generate good DEIs for different dribbling styles, but there is a lot of noise in the background. From the results of GAN guided by dribbling players joints model, the contrast of the player against background is much higher and there is much lower noise in the background.

The training dataset may be augmented using generated data to determine how it affects the classification performance. The DEIs are obtained from the transformation-based registration method as the base dataset. The ResNet-18 is trained following the same experiment set up and the performance is evaluated on the testing dataset. The performance on base dataset, base dataset augmented with DCGAN and Conditional GAN by the dribbling player's joints model reasoned are compared, respectively. A 5-fold cross validation mechanism is used to explore the sensitivity of data augmentation. Results are shown in Table 3.

TABLE 3

Soccer Dribbling Styles Classification Results with Data Augmentation. Base + DCGAN_30 means augmenting base dataset with 30 generated data from DCGAN.

| Dataset | Mean Accuracy | STDEV |
| --- | --- | --- |
| Base | 88.14% | 2.78% |
| Base + DCGAN_30 | 88.47% | 3.26% |
| Base + JointsGAN_30 | 89.83% | 1.7% |
| Base + JointsGAN_60 | 88.47% | 2.21% |

From Table 3, it is shown that by augmenting 30 DEIs of each dribbling styles generated by DCGAN to the training dataset, the mean accuracy of dribbling styles classification can be improved to 88.47% with 3.26% in standard deviation of 5-fold cross validation. Adding the same amount of DEIs generated by Conditional GAN guided by the dribbling player's joints model, the classification accuracy is 89.83% with 1.69% in standard deviation. Comparing the results without data augmentation, it is shown that augmenting the dataset for training can help improve the accuracy of respective networks. In addition, it is shown that using dribbling player's joints model as the condition to the GAN can decrease the standard deviation (from 3.26% to 1.69%) of 5-fold cross validation. This observation aligns with the assumption that providing the dribbling player's joints model to the GAN can help the GAN generate data within the embedding of soccer players. However, when 60 generated DEIs are added in each dribbling style, no improvements are observed. The reason is that samples generated using GAN have low variations and maintain not all the details as real samples. So, even if more samples are used, and these samples are still very similar to each other.

Comparisons on Video Classification Methods

In comparing the system with other classification methods, the first method in the comparison is the one described in Andrej Karpathy, George Toderici, Sanketh Shetty, Thomas Leung, Rahul Sukthankar, and Li Fei-Fei. Large-scale video classification with convolutional neural networks in *CVPR*, 2014. A fixed number of frames are extracted from each video sequence and stacked as the early fusion as the input to the CNN, called video-level 2D-CNN framework. The second method compared is to use 3D-CNN network by Du Tran, Lubomir Bourdev, Rob Fergus, Lorenzo Torresani, and Manohar Paluri. Learning spatiotemporal features with 3d convolutional networks. In *The IEEE International Conference on Computer Vision (ICCV)*, December 2015, which takes the fixed number of frames as the input for video classification, which called 3D-CNN framework, 4 frames and 6 frames are used that are extracted from each video clip respectively in the experiments. The third method that is compared is the two-stream network described in Karen Simonyan and Andrew Zisserman. Two-stream convolutional networks for action recognition in videos. In Z. Ghahramani, M. Welling, C. Cortes, N. D. Lawrence, and K. Q. Weinberger, editors, *Advances in Neural Information Processing Systems* 27, pages 568-576, Curran Associates, Inc., 2014, explores spatial information from one RGB image in a sequence and utilizes temporal information calculated by optical flows from every two consecutive frames in a sequence. Furthermore, the player who is performing dribbling and form a tracklet is extracted from each dribbling video clip. These tracklet sequences are used as the input to both the two-stream network and 3D-CNN again for dribbling styles classification. The last experiment done is to combine features from tracklets using a stream of 3D-CNN and features from DEIs using a stream of CNN. Then combined features are used as the input to the last layer in CNN for classification. The dataset is split into 4 folds and tested with 4-fold cross validation mechanism. After the split, there are 90 video clips of "STEPOVER", 60 of "ELASTICO" and 81 of "CHOP" in each split of the training data. The rest of 33 video clips of "STEPOVER", 21 of "ELASTICO" and 29 of "CHOP" in each split are used as the testing data.

In Table 4, classification performance using different approaches with 4-fold cross validation mechanism is reported. "Affine" means DEIs are generated using transformation-based method for registration. From Table 4, it is shown that, via employing DEIs as input to the deep network, the system achieves classification accuracy of 87.65% on the average and 2.78% as the standard deviation of dribbling styles classification by using ResNet-18 network. Another observation is that by using features extracted from DEIs combined with features from tracklets via 3D-CNN can promote classification accuracy from 64.33% using single 3D-CNN with input of dribbling player tracklets to 85.97%, which illustrates that DEIs indeed contain vital information to capture dribbling styles. The reasons for the poor performance of 3D CNN and two stream CNN are: (1) a single image in spatial stream or even part of a video sequence cannot represent a dribbling style or even a dribbling action so that features extracted from parts of raw RGB images can be used to inference dribbling styles; (2) 3D-CNN and temporal stream is hard to train to generalize features to represent dribbling styles. This is because without dribbling players registration, the motion of the dribbling player across the video sequence and the motion of each part of human body within each frame are quite different, which causes feature-points-based transformation and optical flow to be inaccurate. Therefore, using the system, all frames in the video sequence are registered and utilized to represent a complete dribbling action, and registration based on observation that hip area of the dribbling player is static ensures the motion represented by DEI across a video sequence is accurate.

TABLE 4

Soccer Dribbling Styles Classification Results.

| Method | Mean Accuracy | STDEV. |
| --- | --- | --- |
| Video_2D_CNN [13] | 54.21% | 4.29% |
| Video_3D_CNN(4*) [23] | 53.61% | 3.49% |
| Video_3D_CNN(6*) [23] | 52.11% | 15.16% |
| Spatial_Stream [20] | 59.15% | 4.51% |
| Temporal_Stream [20] | 61.58% | 6.17% |
| Spatial_Tracklet [20] | 57.93% | 6.18% |
| Temporal_Tracklet [20] | 57.92% | 3.78% |
| 3D*_CNN_Tracklet [23] | 64.33% | 2.08% |
| DEI + 3D_CNN_TRACKLET | 85.97% | 2.54% |
| DEI_ResNet18 | 87.65% | 2.78% |

*4 and *6: number of frames sampled from a video sequence as the input to the 3D-CNN.
Soccer Dribbling Styles Classification Results.
*4 and *6: number of frames sampled from a video sequence as the input Conclusions for Athlete Style Recognition This system uses DEI and CNNs to classify dribbling styles of soccer players. The DEI is a single image containing spatial-temporal information of a dribbling video sequence. The system performs image registration to eliminate the camera motion. Generative models are used to augment dataset during the training session. To formalize the generative model to generate data within the specific embedding in the dataset, the system uses the soccer dribbling player's joint model to guide the generative networks. The results show that the system achieves an accuracy of 87.65% in fine-grained dribbling styles classification. With the help of dribbling player's joints model as the condition to the GAN, the accuracy of classification is improved from 88.14% to 89.83%. Experiments on 3D-CNN taking the dribbling player's tracklet as the input, after using features extracted from DEIs to perform late fusion, the classification accuracy is improved from 64.33% to 85.97%. Soccer dribbling is used as example of how the system can be applied, but one skilled in the art can readily recognize that styles of play in other sports may be analyzed using the system.

II. Pose-Guided R-CNN for Jersey Number Recognition in Sports

The above-described system could be augmented by a jersey number recognition system to identify the players in the videos. Recognizing player jersey numbers in sports to match video streams is yet another challenging computer vision task. The human pose and view-point variations displayed in frames lead to many difficulties in recognizing the digits on jerseys. These challenges are addressed by the system using a module that exploits human body part cues with a region-based convolutional neural network (R-CNN) variant for digit level localization and classification. In one embodiment, the system adopts the region proposal network (RPN) to perform anchor classification and bounding-box regression over three classes: background, person and digit. The person and digit proposals are geometrically related and fed to a network classifier. Subsequently, it introduces a human body key-point prediction branch and a pose-guided regressor to get better bounding-box offsets for generating digit proposals. A novel dataset of soccer-match video frames with corresponding multi-digit class labels, player and jersey number bounding boxes, and single digit segmentation masks is collected. The system outperforms all existing models on jersey number recognition task. This automation of player identification across multiple sports is very useful and releasing the dataset will ease research on sports video analysis.

Automated sports video analysis enhances the broadcasting experience for both the narrator and audience by providing auxiliary information of players location and identity at each time point. Match statistics from video analysis can be provided directly to coaches and players to improve strategy planning, opponent scouting, and player performance. Identifying players in sports matches is a key challenge to make all the merits of automatic sports analysis possible. However, there are numerous problems in recognizing players in unconstrained sports video. The video resolution, viewpoint and motions of cameras, players pose, lighting conditions, variations of sports fields and jerseys, all these factors can introduce significant challenges for automatic video analysis. Traditional approaches for player recognition in sports can be organized into two categories: identifying players via face recognition or jersey number recognition. Both approaches have their own strengths and flaws. Face recognition is robust given a high resolution closeup shot, while infeasible for wide shots where faces are indistinguishable or low-resolution images. Jersey number recognition can be achieved under most cases as long as the numbers can be detected or segmented, but suffers from human pose deformation, shooting angles, motion blur, illumination conditions, and the like. Moreover, the detection result is influenced by not only these factors but also distractions within or around the playground, such as yard markers, house numbers (illustrated in FIG. 10), clocks, commercial logos and banners, and the like.

The system described herein uses a pose-guided R-CNN framework to address the challenges associated with player identification through jersey numbers. Faster R-CNN is a two-stage object detector which can perform classification and bounding-box (b-box) regression, and Mask R-CNN is an extension of it with predictions of segmentation masks. They system adapts and expands these methods with re-designed region module and pose-guided b-box regression. The method uses two stages. The first stage addresses the digit-person proposal matching problem using an RPN which outputs candidate object b-boxes across three classes, background, player or digit (as opposed to vanilla RPN, which only proposes two, foreground, background). Person proposals and digit proposals are collected separately from a single RPN without adding many parameters. The second stage uses a modification of Faster R-CNN that replaces ROIPool with RoIAlign and includes a human body key-point branch for predicting key-point masks. The classification and b-box regression are performed on pooled digit features concatenated with key-point masks. This system improves localization performance of digits by associating person and digit Regions of Interest (RoI), as well as adding human pose supervision signal. Consequently, the system only targets digits inside person proposals with the help from keypoint locations.

The main features of this module are as follows:

- The RPN has been re-designed to better fit the jersey number recognition problem. The RPN outputs three classes, i.e., "background", "person" and "digit". By dividing into person and digit proposals, it is possible to match between them to jointly generate better proposals.
- A pose-guided supervision for digit bounding-box is provided. It learns the offsets of proposals given the prediction of human body keypoints. This module is considered as the refinement of RPN proposals.
- State-of-the-art performance for the jersey number recognition task in comparison to previously systems is provided. Significantly different from previous systems, the current system is capable of locating and predicting multiple numbers from input images.

A novel dataset of, in one embodiment, 3567 images that offers person and digit bounding-boxes, human body keypoints and digit masks is provided. One or more players and digits are annotated per image.

Figure 11:
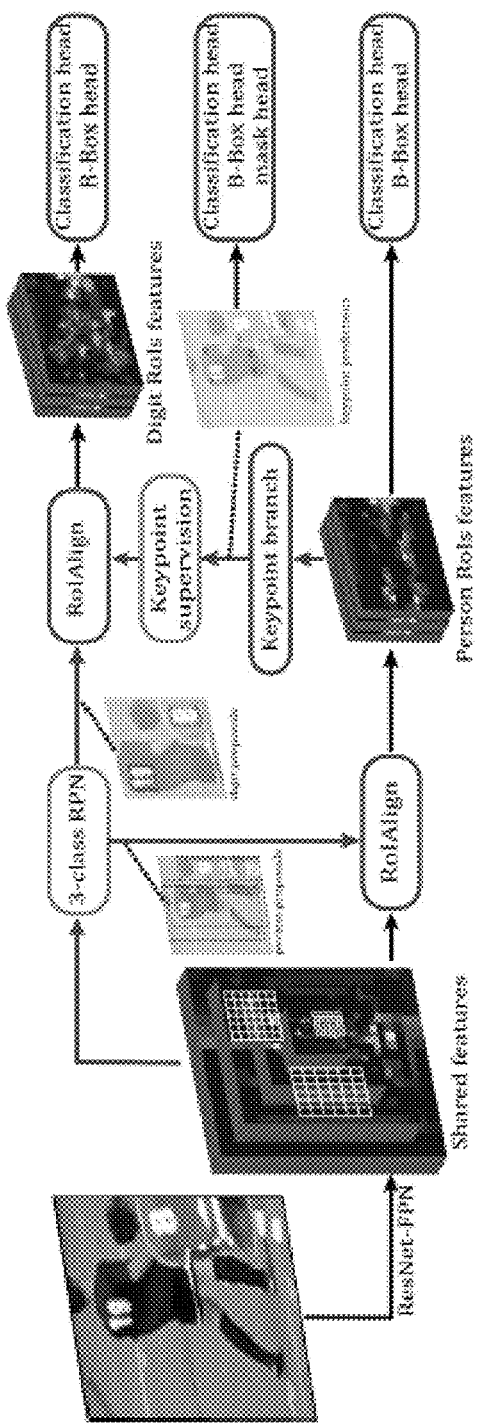
FIG. 11 is a system entity flow diagram illustrating dataflow in the system for jersey number recognition.

With reference to FIG. 11, a system entity flow diagram illustrates dataflow in the system for jersey number recognition. In the system described herein, the jersey number recognition module replaces a vanilla faster R-CNN with a 3-class RPN and extends it with additional key-point branch and human pose supervision, yielding the pose-guided R-CNN system shown in FIG. 11. For real-time applicability, a corresponding light-weight model without sacrificing much performance that runs at 12 fps on a single NVIDIA GeForce GTX 1080 Ti GPU.

RoIAlign Faster R-CNN

From previous task definition, region-based methods can be employed in the system. One of the successful architectures is faster R-CNN. It consists of a backbone feature extractor, a region proposal network, followed by a feature pooling module, and network heads for b-box regression and classification for each RoI. For an image, shareable convolutional (Conv) features are extracted first with choices of backbone architectures such as VGG-16, ResNet and ResNeXt. Then the RPN generates a set of reference boxes (anchors) from an image of any size. For each pixel location, there can be arbitrary number of anchors given different scales and aspect ratios. A sliding network will traverse each pixel location and predicts if an object exists in the corresponding anchor and regresses the b-box from shared features. After the proposals are generated, the pooled features for each RoI will be fed into the fully connected layers to perform detection and classification. Feature extraction from each RoI is done with RoI max pooling (RoIPool) such that a h×w Conv feature map is divided into numbers of h/H× w/W sub-windows then max-pooling is performed for each grid with quantization. For each detected b-box, non-maximum suppression (NMS) is used to filter out similar and close b-boxes.

Some modules are improved by Mask R-CNN. First it incorporates the feature pyramid network (FPN) with the backbone to generate multi-scale features. It then replaces RoIPool with RoIAlign which interpolates the sampled feature for better alignment between RoI and input feature maps. It adds an extra branch to generate object masks in parallel in addition to classification and b-box regression. The output mask is represented as a m×m px binary mask from each RoI without losing the spatial layout of convolutional features. Faster R-CNN is referred to in this improved implementation unless specified herein.

The loss for this baseline is defined as a multi-task loss both for final prediction and RPN proposals:

$$L = L_{cls} + \lambda L_{reg} \quad (5)$$

where Lcls is classification loss, Lreg is the b-box regression loss, and $\lambda$ is the multi-task balance weight. The system considers each digit from 0 to 9 as a class, a 'person' class and a 'background' ('BG') class, in total of K=12 independent classes. Ground-truth class is denoted by a where $u_{BG}=0$ by convention. For each RoI, the output layer will produce a discrete probability distribution $p=(p_0, p_{K-1})$, then the class loss is defined as log loss for true class $$L_{cls}(p, u) = \log p_u \quad (6)$$

The localization loss is defined as $$L_{reg}(t^u, v) = \sum_{i \in \{x, y, w, h\}} smooth_{L_1}(t_i^u - v_i), \quad (7)$$

where u>0 ('BG' class does not contribute to the loss), and is predicted bounding-box offsets four-tuple (x, y, w, h) for class u. (x, y) is the top-left corner coordinate, (w, h) is the predicted dimension of the b-box. $v=(v_x, v_y, v_w, v_h)$ is the ground-truth b-box. $smooth_{L_1}$ is a robust $L_1$ loss against outliers defined in R Girshick. Fast r-cnn, *Proceedings of the IEEE International Conference on Computer Vision*, pages 1440-1448, 2015.

Proposal Association

Above, described are generated proposals of either one digit or a person and the same for final detections. To collect the final results in terms of jersey numbers, the system reduces the problem into a graph matching problem with some relaxations. Nodes of the graph are the person and digit proposals, and the edges are all possible connections between pairs of person and digit proposals. The weight of each edge is computed by the Euclidean distance between the two centers of bounding boxes. And for each person node, there must exist k edges matched with digit nodes, where 1≤k≤2. So, each person node can be matched with up to two other digit nodes which is not necessarily bipartite matching. The problem is then solved by choosing the top-2 digit proposals for each person proposal.

Three-Class Region Proposal Network

The original RPN only estimate the probability of each proposal being an object or not. It takes shared features to perform classification and bounding-box regression of anchors. The motivation is simple: instead of just 2 classes, System uses 3 classes to represent 'BG', 'person' and 'digit' by adding very few parameters. In this way, anchors are not treated independently. Anchors are divided into person and digit anchors that are then correlated by their spatial relationships.

No modifications are made to the pre-defined anchor settings described in M. Sari, H. Dujmi, V. Papi, and N. RožI. Player number localization and recognition in soccer video using hsv color space and internal contours, *The International Conference on Signal and Image Processing (ICSIP* 2008), 2008 wherein there are lots of overlaps among anchors. Each anchor is actually associated with many other anchors in terms of location. For example, if an anchor is of scale 512, some anchors of scale less than 512 will be inside it. The proposal scheme is modified to accommodate this anchor association. For training vanilla RPN, each positive anchor is assigned based on two criteria. The following conditions are provided along with three-class RPN:

Anchor(s) that has/have the highest Intersection-over-Union overlap with certain ground-truth box.

Person anchors with IoU higher than 0.7.

Digit anchors with IoU higher than 0.7 and inside any person anchor.

After filtering and assignment of anchors, the system associates each digit anchor to its closest person anchor based on Euclidean distance between centers of the two boxes.

Pose-Guided Supervision

Mask R-CNN can also perform human body keypoints estimation as stated in K. He, G. Gkioxari, P. Dolla'r, and R. Girshick. Mask r-cnn, *Proceedings of the IEEE International Conference on Computer Vision*, pages 2961-2969, 2017. Similar to the binary mask representation of objects, each body keypoint is modeled as an object except that there is only one pixel labeled in the mask. For K types of keypoints, e.g. right shoulder, left hip, etc., there are K individual one-hot masks. Human body modelling is not required in Mask R-CNN framework to achieve fair results. In the case of jersey number recognition, jersey number localization can be performed better given body keypoints layouts. Though Faster R-CNN is capable of bounding-box regression for jersey numbers, there are limitations under more sophisticated scenarios. For example, complex jersey patterns, different number fonts, and numbers on the court introduce difficulties for RPN to generate satisfactory proposals. To tackle the problem, a pose-guided supervision branch may be used for refining number localization.

A keypoint branch for predicting key-point mask is added similarly to that described in K. He, G. Gkioxari, P. Dolla'r, and R. Girshick. Mask r-cnn, *Proceedings of the IEEE International Conference on Computer Vision*, pages 2961-2969, 2017 and R. Alp Güler, N. Neverova, and I. Kokkinos. Densepose: Dense human pose estimation in the wild, *Proceedings of the IEEE Conference on Computer Vision and Pattern Recognition*, pages 7297-7306, 2018. The keypoint detection is only applied on person RoIs. At this point, each person RoI is associated with multiple digit RoIs as a result of three-class RPN. The keypoint mask is fed into a shallow network to obtain b-box offsets with which the system can use to correct the RPN proposals. Features of refined proposals are then pooled via ROIAlign. It involves a transformation from keypoint locations to associated digit b-box regression in a hidden space. Finally, a digit branch is formulated that is responsible for digit recognition on refined RoIs. This cascade design provides digit RoIs with more information outside their regions.

The pose-guided network in the system described herein takes predicted key-points mask from each person RoI as inputs and output the b-boxes offsets of corresponding jersey numbers. It is a small but effective network consisting of three fully connected layers.

The loss function 1 can be modified accordingly by adding related keypoint classification and regression loss $L_{cls}^{keypoint}$, $L_{reg}^{keypoint}$. Then the regression loss for digit b-box is computed from the RoI refined by keypoint mask. The final loss function is $$L=L_{cls}+\lambda L_{reg}+\eta \lambda L_{cls}^{keypoints}+\gamma \lambda L_{reg}^{keypoint}, \quad (8)$$

where η and γ are hyper-parameters similar to λ.

Experimental Results

The system's novel pose-guided R-CNN, as well as related models, are evaluated on the collected dataset, since there is no publicly available dataset on jersey numbers. The evaluation metrics used are standard average precision (AP) with IoU thresholds set to 0.5 and 0.75, and AP average (mAP) across IoU from 0.5 to 0.95. Number-level and digit-level accuracies are also reported.

Dataset

The dataset is gathered from four full soccer matches. The recording device used is a single Canon XA10 video camera which is installed 15 feet high, and 10 to 20 feet away from the horizontal baseline of the soccer field. For better video qualities in terms of recognizable jersey numbers, the camera operator is allowed to pan and zoom accordingly. Next, the collected videos are converted into frames by two different ways. One is to perform a human detector over frames scaled by 2 to get reliable images containing players. OpenPose is used for person detection. In order to collect more difficult images, Random shifts and paddings are added to detected areas. The detection results are padded by 150px and a random shift of 20px. After data collection was complete, two professional annotators labeled any legible jersey numbers via VGG Image Annotator. As a result, there are arbitrary numbers of ground-truths (GT) per person per image.

Figure 12:
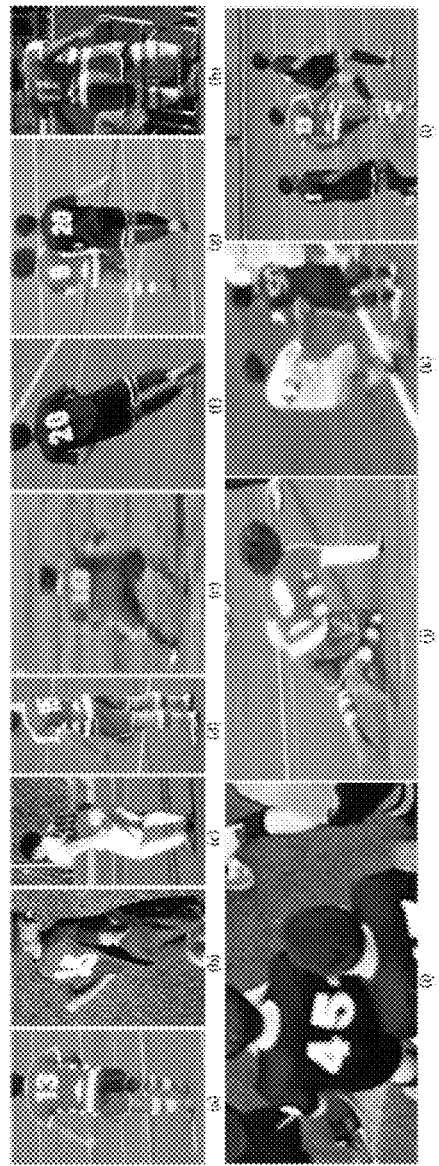
FIG. 12 shows a few examples of the dataset.
Figure 13:
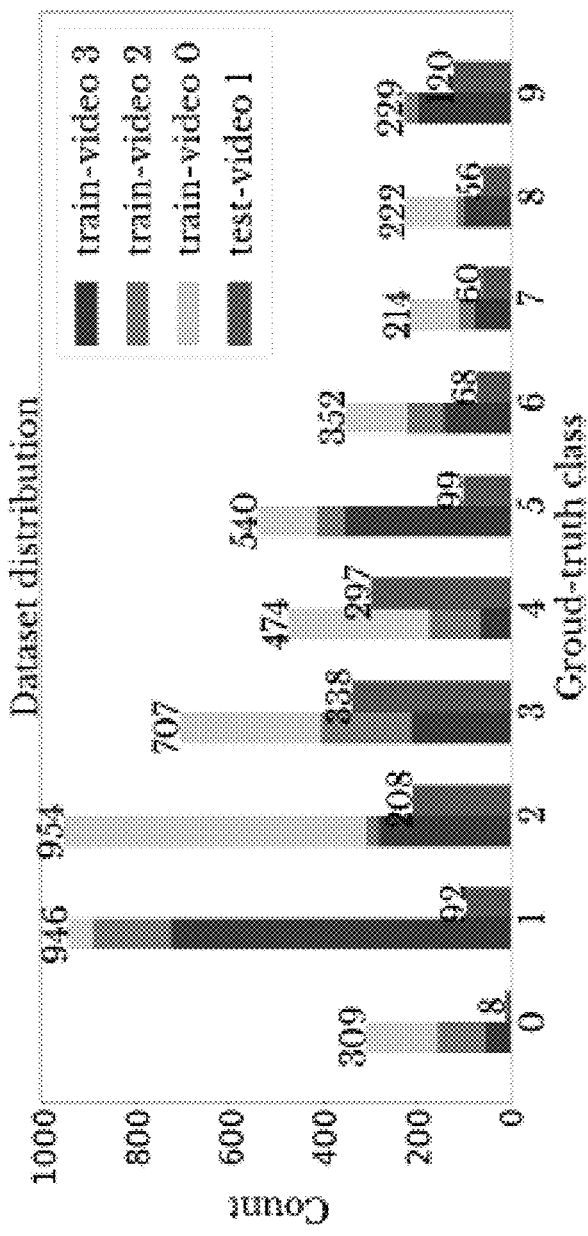
FIG. 13 is a chart illustrating the distribution of a dataset.
Figure 14:
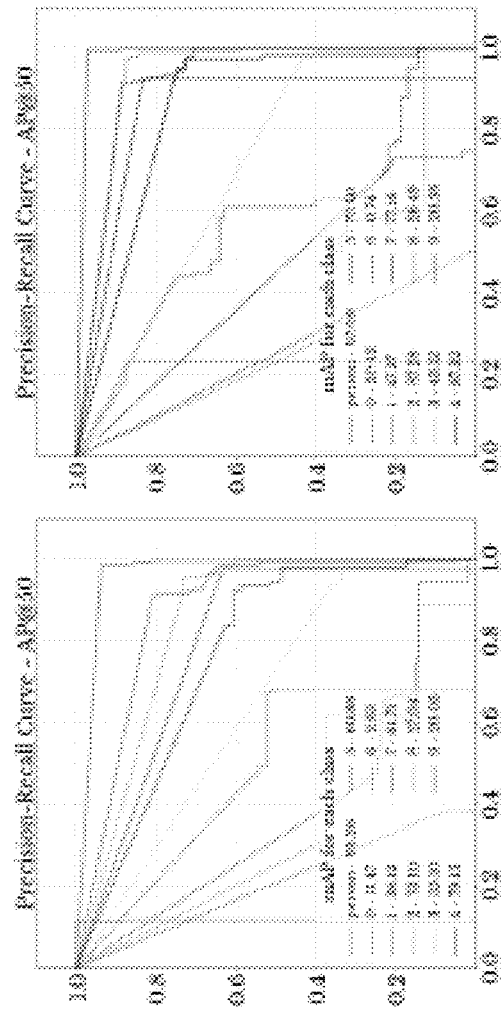
FIG. 14 is an illustration of precision-recall curves over each class.

With reference to FIG. 13, a chart showing the distribution of data is shown. A total of 3567 images are annotated with ground-truth (GT) digit masks resulting in 6293-digit instances. All images are also labelled with person bounding-boxes and four human body key-points, namely left shoulder (LS), right shoulder (RS), left hip (LH) and right hip (RH). There are 114 images contain multiple numbers, and each digit is labeled with its associated person box. FIG. 12 shows a few examples for the dataset. Dataset statistics are illustrated in Table 5.

TABLE 5

Dataset statistics. H, W, h and w are image height, image width, digit b-box height, and digit b-box width respectively. For heights and widths, the unit is pixel; mask area counts the number of pixels on the object; mask center is normalized within range [0, 1].

| | H | W | h | w | Digit mask area | Digit mask center |
|---|---|---|---|---|---|---|
| Mean | 315.06 | 214.53 | 34.70 | 18.90 | 424.40 | (0.50, 0.29) |
| Std | 92.11 | 38.47 | 15.16 | 7.85 | 20.69 | (0.12, 0.09) |

Bounding-box sizes are sorted into small (area<$32^2$), medium ($32^2$<area<$96^2$) and large (area<$96^2$) objects like COCO dataset. For person b-boxes, there are 4111 large, 213 medium and 1 small objects; for digit ones, there are 7 large, 1210 medium and 5076 small objects.

Implementation Details

The hyper-parameters in the loss function 4 are all set to one. All the experimented models make use of image augmentation technique by applying random affine transformation and hue/saturation manipulation to both original image and corresponding b-box. The backbone feature used in all experiments is ResNet-FPN. ResNet features are used at 4 different stages [C2, C3, C4, C5] to build the feature pyramid. The constructed RPN features are [P2, P3, P4, P5, P6]. The light-weight model removes C5 and P6. For RPN anchors, 5 scales [32, 64, 128, 256, 512] and 3 ratios [0.3, 0.5, 1] are used. For the classification network head, P6 is not used as input. Partial implementation is performed.

Person and keypoint branches: The keypoint branch is based on mask prediction in Mask R-CNN, except that the keypoint mask is up-sampled to 32×32.

Digit branch: The pose-guided supervision module consists of two 512 Fully-Connected (FC) layers, and a N×4 FC layer with linear activation as digit b-box regression head. N is the number of proposals, so it outputs the b-box offsets for each digit RoI. The rest of the branch resembles person branch except for the pooling size to be 16×16 in digit classification head. It gives better performance since digits are relatively small in images.

Different settings, including but not limited to, changing the backbone features, input image size, image operations (re-sizing, padding, cropping, etc.), number of image channels are used in experimentation. ResNet-FPN-18, ResNet-FPN-50 and ResNet-FPN-101 with/without proposed pose-guided module are investigated. For collecting convincing results, the dataset is divided video-wisely, with video 0, 2, 3 for training and video 1 for testing.

Pre-train: To accommodate the lack of person-keypoint data in the collected dataset, the network is pre-trained on the COCO dataset with a frozen digit branch. In this dataset, 17 human body keypoints are annotated, but four of them are used for less parameters and better convergence. Person and keypoint branches are then unfrozen, and the digit branch is trained with Street View House Number (SVHN) dataset. This large-scale dataset consists of digit sequences with each digit labeled with bounding box. The model benefits from this dataset for training the backbone feature extractor.

Training: The model is trained for 100 epochs with starting learning rate (LR) 0.01. Learning rate is reduced by 10 every 20 epochs. The rest hyper-parameters are same with Mask R-CNN.

Testing: The settings are the same as training except that less (set to 100) detections are kept.

Main Results

The system described herein is compared to available methods in the field of jersey number recognition as shown in Table 6. All variants of the system outperform previous state-of-the-art models. Comparable pervious approaches can only perform image-level recognition.

TABLE 6

Comparison of results among approaches. Our method achieves the best accuracy (ACC) for both number-level and digit-level recognition. Input is cropped grayscale image for Gerke's [10], and orignial RGB image for all other approaches.

| Framework | Backbone | Input | $ACC_{number}$ | $ACC_{digit}$ |
| --- | --- | --- | --- | --- |
| Gerke [10] | — | $40^2$ | 65.04% | — |
| Li et al. [18] | — | $200^2$ | 74.41% | 77.86% |
| Li et al. [18] | ResNet-50 | $512^2$ | 77.55% | 80.23% |
| Faster R-CNN | ResNet-FPN-50 | $256^2$ | 86.13% | 89.32% |
| Faster R-CNN | ResNet-FPN-50 | $512^2$ | 88.74% | 90.09% |
| Faster R-CNN | ResNet-FPN-101 | $512^2$ | 89.02% | 91.11% |
| Pose-guided (Ours) | ResNet-FPN-18 | $512^2$ | 81.66% | 83.97% |
| Pose-guided (Ours) | ResNet-FPN-50 | $256^2$ | 90.84% | 92.13% |
| Pose-guided (Ours) | ResNet-FPN-50 | $512^2$ | 91.01% | 93.29% |
| Pose-guided (Ours) | ResNet-FPN-101 | $512^2$ | 92.14% | 94.09% |

Figure 15:
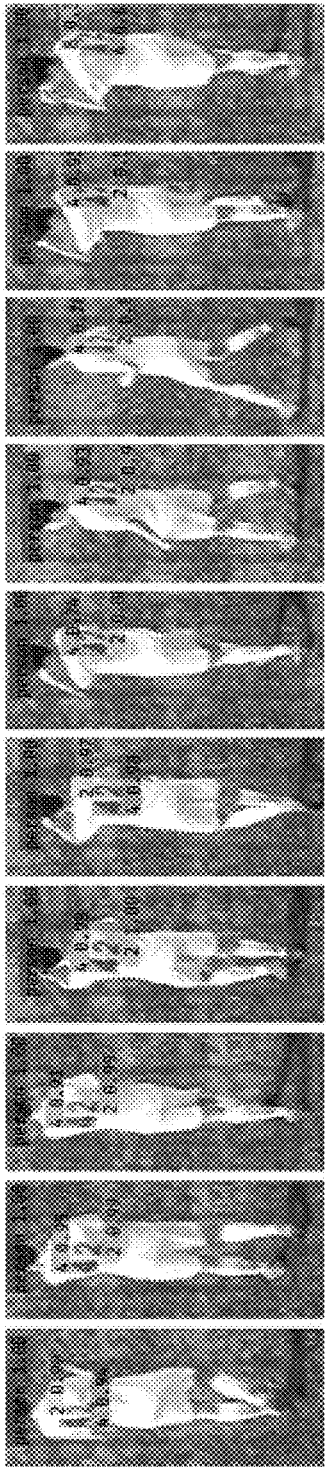
FIG. 15 is an illustration of Recognition results across different poses.

For fair comparison, multi-number images are removed during training and testing. Each image is grayscale, cropped and re-sized to 40×40. Without access to a dataset, this embodiment is implemented without axis supervision. Its variant with ResNet-50 is also implemented. Faster-RCNN is also a strong baseline which already outperforms other systems. The system described herein achieves even better performance that is highly robust to post variations. FIG. 15 is a visualization of the recognition results against different poses. Both digit-level and number-level accuracies are evaluated. The results are illustrated in Table 6.

Evaluation metrics including number-level and digit-level accuracies, mean average precision (mAP), $AP_{50}$, and $AP_{75}$ are used to compare variants of the R-CNN approaches. APs for different object scales are not used since most 'person' boxes are large and most 'digit' are small. The results are shown in Table 6. The proposed pose-guided R-CNN gives the best overall results.

Ablation Study

In one embodiment, only ResNet-FPN-50 is used as the backbone given for several reasons: it has around 19M less parameters; there may be a small dataset so ResNet-50 is more suitable; models may not be fine-tuned so better performance can be achieved through regularization. Therefore, ResNet-FPN-50 may be selected over ResNet-FPN-101 without sacrificing much performance. Multi-number images are included for experiments in this discussion.

Input size: To build a feature pyramid for ResNet-50, there may be a need to resize the image so that its width and height can be divided by 2 at least 5 times. The image may need to be resized enough since the numbers in the dataset are mostly small objects. For simplicity, in one embodiment, the image may be re-sized to square the image with paddings while keeping the aspect ratio. Experiments were performed with several sizes: 128, 256, 512, and 1024. When the input size is 512, it achieves the best performance of mAP 44.74, which outperforms 10.20, 3.12 and 0.56 points with respect to size 128, 256, and 1024.

Does 3-class RPN solely help: With the baseline of Faster R-CNN, it is desirable to evaluate if replacing the vanilla RPN with the system's 3-class RPN help improve the performance. An image size of 512×512 is used as input, and ResNet-FPN backbone for this experiment's settings. Three-class RPN has −0.09, 0.12 and −0.14 gain respectively over vanilla RPN on mAP, $AP_{50}$, and $AP_{75}$. Both give similar experimental results, so it suggests that by just switching to three-class RPN, the performance is not significantly influenced. RPN is a shallow 'neck' network for anchor classification and regression. Splitting an 'object' class into 'person' and 'digit' does not introduce hardness for these two tasks. One key function of the novel three-class RPN is dividing then matching person and digit anchors. If the following structure remains the same with faster R-CNN, the results are expected to be similar. However, because of the match of the anchors in three-class RPN, the proposal association procedure for number-level prediction can be removed.

Figure 16:
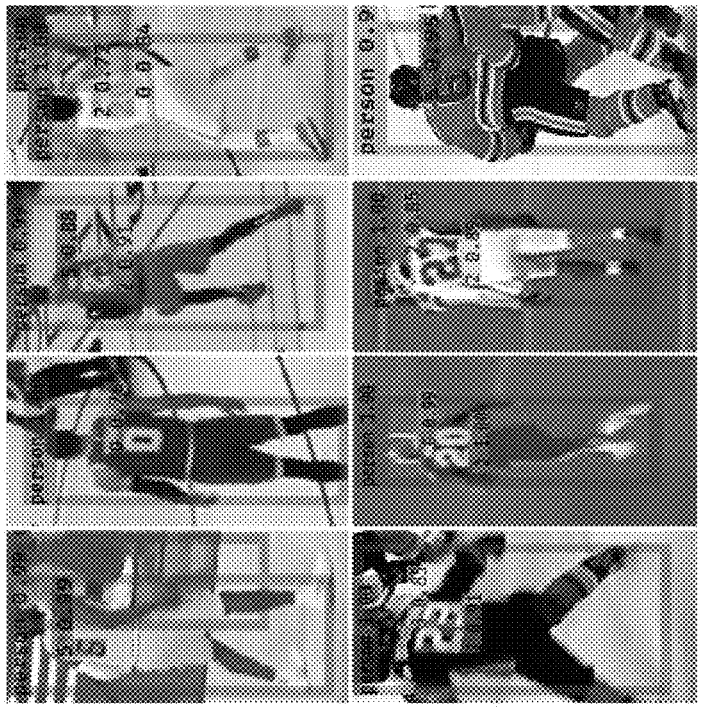
FIG. 16 is an illustration of internet videos for different sports.

Pose-guided R-CNN: Table 6 suggests that there is 4.14 gain over Faster R-CNN. AP50 for each class for these two models illustrated in FIG. 15 can also be reported. It shows significant improvement achieved by adding pose supervision which has a keypoint mAP of 58.2. The reason of poor performance on '0' is that very few images contain '0' in test dataset, so it drops drastically even if only one of them is classified incorrectly. FIG. 15 provides recognition results of the system's pose-guided R-CNN method against different poses. However, there are still some limitations under extreme poses as the last two examples shown in FIG. 14. For testing the model's generalization, some images were also collected from internet videos for different sports: basketball, American football and hockey. The results are illustrated in FIG. 16. Fair detection results are still obtained, but classification performance is reduced. Recognition is possibly simpler for soccer and basketball due to plain jerseys, while jerseys in American football and hockey are normally bulky with sharp contours. Better performance can be achieved by gathering more data across different sports.

Conclusion for Pose-Guided R-CNN for Jersey Number Recognition in Sports

For jersey number recognition, a pose-guided R-CNN multi-task module is proposed as an all-in-one solution for person detection, body keypoints prediction and jersey number recognition. It produces the best digit accuracy of 94.09%, compared with related prior art. Three elements are used to achieve this performance: 1. re-designed three-class RPN for anchor association; 2. implementation of pose-guided localization network that can impose proposal refinement for jersey number location through human pose; 3. the generality of region-based CNN model. By combining the three components, the proposed approach is end-to-end trainable and can be easily extended to other sports.

III. Generating Visual Analytics and Player Statistics

The world of sports intrinsically involves fast and complex events that are difficult for coaches, trainers and players to analyze, and also for audiences to follow. In sports, talent identification and selection are imperative for the development of future elite level performers. Current scenarios involve word-of-mouth, coaches and recruiters scouring through hours of videos and many times manual annotation of these videos. This module of the system automatically generates visual analytics from videos specifically for soccer to help coaches and recruiters identify the most promising talents. The system uses (a) convolutional neural networks (CNNs) to localize soccer players in a video and identify players controlling the ball, (b) deep convolutional generative adversarial networks (DCGAN) for data augmentation, (c) a histogram based matching to identify teams and (d) frame-by-frame prediction and verification analyses to generate visual analytics. An accuracy of 86.59% is achieved on identifying players controlling the ball and an accuracy of 84.73% in generating the game analytics and player statistics.

Figure 17:
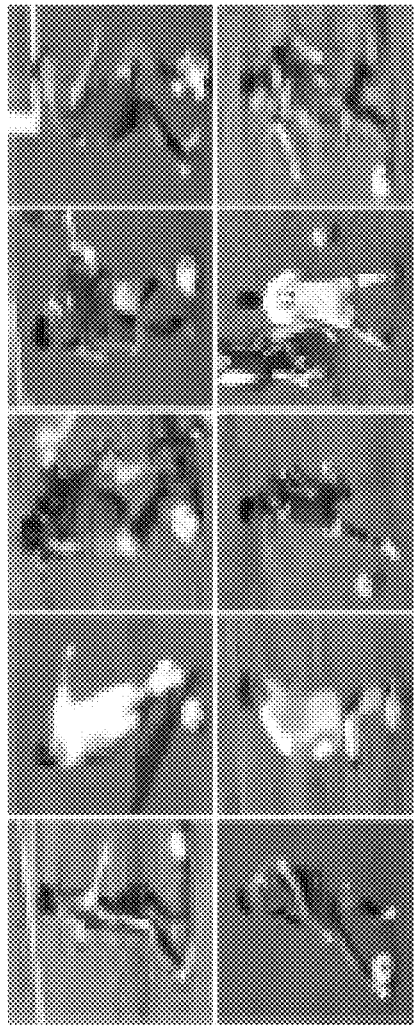
FIG. 17 illustrates examples of images of players with a ball.
Figure 18:
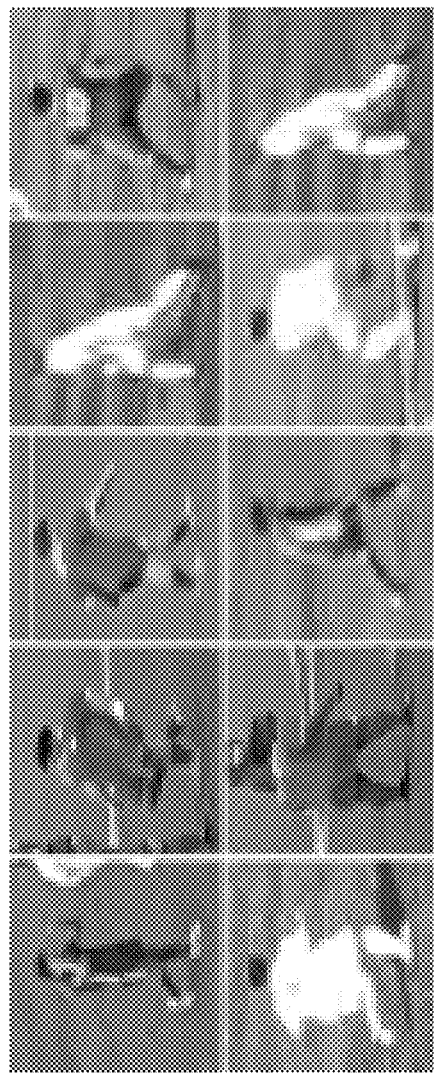
FIG. 18 illustrates examples of images of players without a ball.

A system is provided to automate the talent identification problem by generating visual analytics and player statistics for soccer from a video using traditional algorithms and deep learning techniques for computer vision. For this purpose, a dataset was collected that includes 49,952 images which are annotated into two classes namely: players with the ball (12,586 images) and players without the ball (37,366 images). FIG. 17 shows examples of players with the ball and FIG. 18 shows examples of players without the ball, respectively, from the dataset. Some of the key features include:

A system to automatically generate visual analytics and player statistics for soccer matches from videos.

Dynamic identification of players controlling the ball using Convolutional Neural Networks.

Strategy to train generative adversarial networks (GAN) that augments the datasets to improve the performance of the system.

Extensive experimentation on a dataset collected from different soccer games.

Trained networks on team dependent and team independent datasets to show the generalizability of the system during different scenarios of the game.

Figure 19:
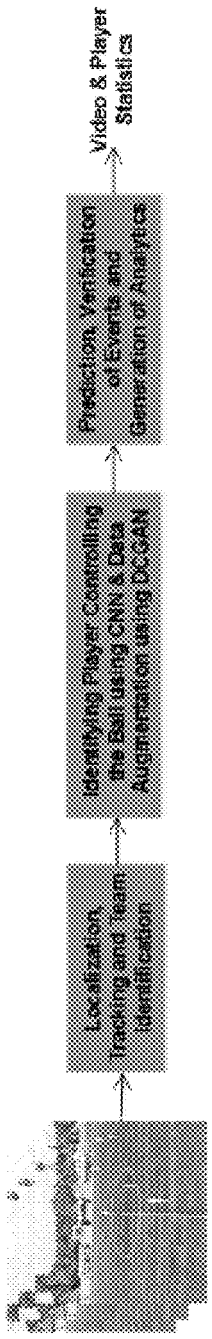
FIG. 19 is an overall architecture of the module for automatically generating visual analytics.

With reference to FIG. 19, an overall architecture of the module for automatically generating visual analytics is shown.

Localization of Soccer Players

In one embodiment, the soccer players in the incoming video stream using YOLO9000—real-time object detection described by J. Redmon and A. Farhadi, Yolo9000: Better, faster, stronger, arXiv preprint arXiv:1612.08242, 2016. The framework of YOLO9000 comprises a single CNN that predicts multiple bounding boxes for an image along with the respective class probabilities for each bounding box. YOLO9000 divides the input image into 11×11 grids and for each grid, the CNN predicts a set of bounding boxes along with the conditional probability for each class.

In on embodiment, the network is trained on the PASCAL VOC 2007 dataset, the COCO 2016 keypoints challenge dataset and Imagenet. All of these datasets comprise very diverse images for the class People which also includes sports players. The images in these datasets have different scale variations, and occlusions which is similar to the scenario on a soccer field. For a given frame, the bounding boxes belonging to the class People with probability greater than a threshold are considered to be the locations of the soccer players for that frame.

Tracking of Soccer Players

After detecting the soccer players in consecutive frames, one embodiment may use the DeepSort tracking method described by N. Wojke, A. Bewley and D. Paulus, Simple online and real-time tracking with a deep association metric, arXiv preprint arXiv:1703.07402, 2017, to track the soccer players over consecutive frames and formulate the association of the soccer players as a re-identification problem. The system performs training a YOLO9000 based CNN. The CNN detects the players in each frame and extracts a feature set for each player. The authors also concatenate a 8-dimensional state-space feature set (u, v, γ, h, u v, γ', h') where, (u, v) is the image coordinate of the center of the bounding box, 'y is the aspect ratio, h is the height of the bounding box and (u', v', y', h') are their respective velocities in the image coordinate. The association of the soccer players in the next frame is done by using the visual appearance feature from the CNN and 8-dimension state-space motion feature as input to a Hungarian algorithm.

Histogram Matching for Team Identification

Soccer matches involve two teams wearing different colored jerseys. Each of these jerseys is visually very different from the other, hence in the approach a simple histogram based matching approach was sufficient for identifying the team of a given player.

Figure 20:
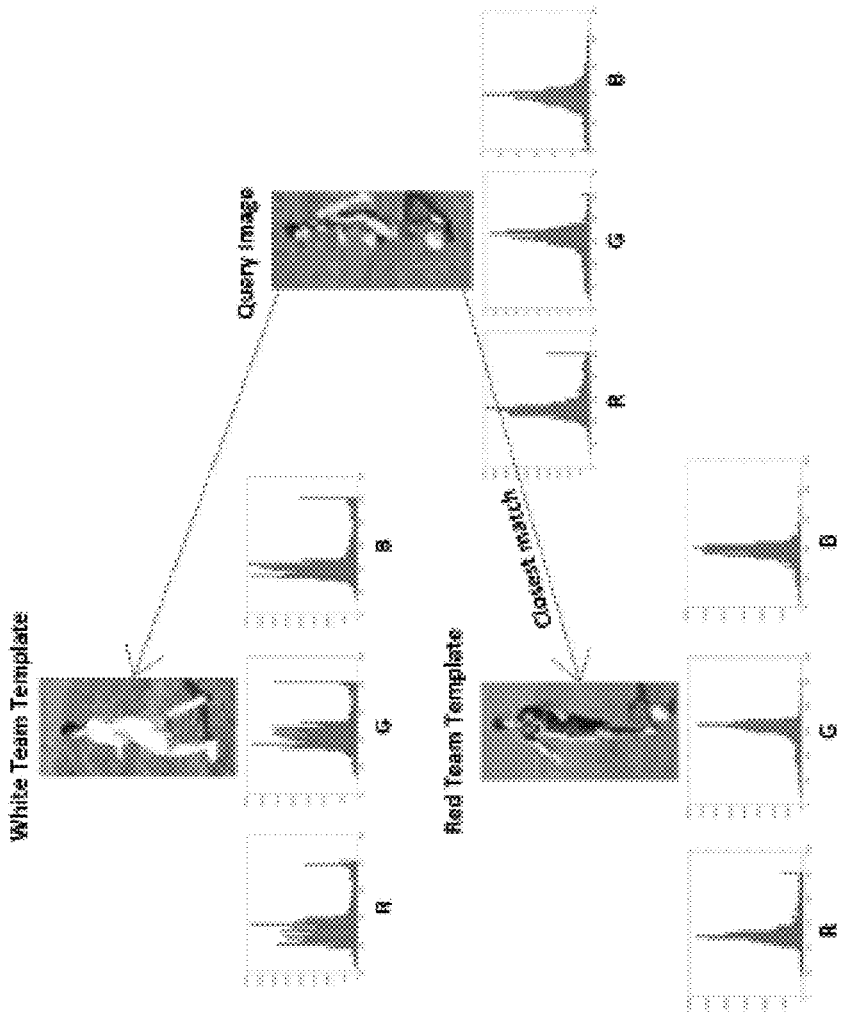
FIG. 20 illustrates the process of histogram matching for team identification.

Before processing the video, the region-of-interest (ROI) cropped of 10 random players from each team and their corresponding goal keepers and use them as a reference template. Next, after detecting the soccer players for a given frame, the ROI of each soccer player is cropped, its 64-bit color histogram (in one embodiment) is computed and compared with each of the templates. The team with the closest average Euclidean distance is selected as the team of the player. FIG. 20 shows the process of histogram matching for team identification.

Identifying Player Controlling the Ball Using CNN & Data Augmentation Using DCGAN To generate player statistics and visual analytics for soccer, a first step is to identify the player who is in control of the ball at any given point of time. To achieve this, the system may use convolutional neural networks trained to classify a given ROI of the soccer player as either "a player with the ball" or "player without the ball".

CNN Fir Identifying Player with the Ball

Experiments were performed with baseline customized networks and fine-tuned state-of-the-art networks, namely: VGG-16, VGG-19, ResNet18, ResNet34 and AlexNet. In order to train the system, the images were resized to be of size 224×224. A mini batch size of 128 was selected and during every epoch, the training data is randomly shuffled and randomly horizontal-flipped. All the networks were pre-trained on the ImageNet dataset. Since the ImageNet dataset has 1000 classes, the last fully connected layer was modified from 1000 to 2 classes.

Customized networks were identified to determine if preserving the aspect ratio helps in improving the classification performance. The average aspect ratio of the images in the dataset was found to be 0.642. To keep all the images of a uniform size the images were resized to 160×100. Table 7 and Table 8 show the architecture of the networks. In Table 7 and Table 8, conv(x, y, z) represents convolution(kernel size=x, stride=y, padding=z). Furthermore, the weights for SoccerNet 1 and SoccerNet 2 were initialized with uniform Xavier distribution as described in X. Glorot and Y. Bengiom, Understanding the difficulty of training deep feedforward neural networks, *Proceedings of the 13th International Conference on Artificial Intelligence and Statistics*, pages 249-256, 2010.

A parameter search was performed for all the networks to obtain the best learning rate, momentum and weight decay. The networks were optimized using the stochastic gradient descent algorithm with weighted cross entropy loss. Since the initial dataset used was unbalanced, complementary a-priori probability of each class as weights in the loss function was used.

$$C_i = 1 - X_{ci}/X_{is} \quad (9)$$

Xci is the total number of images belonging to class $C_i$ and Xis the total number of images for all classes.

The random parameter search was done by training and validating a given network with random values within a range for each parameter for 5 epochs, and the combination of parameters that resulted in the highest mean accuracy were chosen as the best parameters for that given net-work. Table 9 shows the best parameters that were obtained for training all the networks mentioned above.

TABLE 1

Architecture of SoccerNet 1

| Input dim. | Output dim. | No. of Feature maps | Layer |
|---|---|---|---|
| 160 × 100 | 80 × 50 | 64 | Conv(5, 2, 2) |
| 80 × 50 | 40 × 25 | 128 | Conv(5, 2, 2) |
| 40 × 25 | 20 × 12 | 256 | Conv(5, 2, 2) |
| 20 × 12 | 10 × 6 | 512 | Conv(5, 2, 2) |
| 10 × 6 | 5 × 3 | 512 | Conv(5, 2, 2) |
| 7,680 × 1 | 2 classes | — | FC layer |

TABLE 2

Architecture of SoccerNet 2

| Input dim. | Output dim. | No. of Feature maps | Layer |
|---|---|---|---|
| 160 × 100 | 80 × 50 | 128 | Conv(5, 2, 2) |
| 80 × 50 | 40 × 25 | 256 | Conv(5, 2, 2) |
| 40 × 25 | 20 × 12 | 512 | Conv(5, 2, 2) |
| 20 × 12 | 10 × 6 | 1024 | Conv(5, 2, 2) |
| 10 × 6 | 5 × 3 | 1024 | Conv(5, 2, 2) |
| 15,360 × 1 | 2 classes | — | FC layer |

The random parameter search was done by training and validating a given network with random values within a range for each parameter for 5 epochs, and the combination of parameters that resulted in the highest mean accuracy were chosen as the best parameters for that given network. Table 9 shows the best parameters that were obtained for training all the networks mentioned above.

TABLE 9

Best parameters for fine tuning the networks

| Network | Learning rate | Momentum | Weight decay |
|---|---|---|---|
| SoccerNet 1 | $2 \times 10^{-2}$ | 0.6 | $1 \times 10^{-3}$ |
| SoccerNet 2 | $7.5 \times 10^{-2}$ | 0.8 | $1 \times 10^{-3}$ |
| VGG-16 | $2.5 \times 10^{-3}$ | 0.6 | $1 \times 10^{-4}$ |
| VGG-19 | $4 \times 10^{-3}$ | 0.8 | $1 \times 10^{-4}$ |
| ResNet18 | $6 \times 10^{-3}$ | 0.9 | $1 \times 10^{-4}$ |
| ResNet34 | $6.5 \times 10^{-3}$ | 0.9 | $1 \times 10^{-4}$ |
| AlexNet | $3 \times 10^{-3}$ | 0.7 | $1 \times 10^{-4}$ |

Dataset Augmentation using DCGAN

The purpose of data augmentation is to determine if adding more variability to the training dataset helps to improve the performance of the network.

To achieve this, a deep convolutional generative adversarial network (DCGAN) was trained. It consists of two deep convolutional neural networks, a generator G and a discriminator D trained against each other. The generator takes a random noise vector, z, and returns an image, $X_{gen} = G(z)$. The discriminator takes a real or a generated image, and outputs a probability distribution $P(S|X) = D(X)$ over the two image sources. The discriminator is trained to maximize the log-likelihood of assigning the correct source while G tries to minimize it. The optimization function V is given by:

$$\min_G \max_D V(D, G) = \mathbb{E}_{x \sim p_{data}(x)}[\log D(x)] + \mathbb{E}_{x \sim p_z(z)}[\log(1 - D(G(z)))] \quad (10)$$

The objective is that the two networks converge to the Nash equilibrium so that D is maximally confused, and G generates samples that resemble the training data (in one case players with the ball). The described in A. Radford, L. Metz, and S. Chintala, Unsupervised representation learning with deep convolutional generative adversarial networks, arXiv preprint arXiv:1511.06434, 2015, for designing a stable architecture for generating images of better quality. The authors of that reference suggested replacing pooling layers with convolutional layers for both the generator and discriminator, using batch normalization after convolutional layers, ReLU activation in the generator and Leaky ReLU in the discriminator. Based on this reference, the system was designed to use a generator and discriminator network to learn to generate images that resemble players with the ball.

Prediction, Verification of Events and Generation of Analytics

After tracking a soccer player, determining his/her team and identifying the player controlling the ball, the system detects if the player controlling the ball changes over successive frames. If so, it is determined if the new player controlling the ball belongs to the same team. If the new player belongs to the same team, it is defined as a successful pass, otherwise it is a failed pass.

Based on this logic visual analytics describing which player currently controls the ball and when a pass is made is created. The system also keeps track of the duration each player controls the ball (ball possession) and the total number of successful passes each player has made, thus, generating player's performance statistics.

When two or more players are very close to each other, it becomes difficult for the network to identify which players controls the ball. To solve this, the system may use a low pass filter to help smooth the transition between player controlling the ball. By doing so some false alarms due to the misclassification of player with the ball were also avoided.

Experiments

The system was trained and evaluated on datasets collected from different soccer matches. The system was implemented on pytorch with 4 TITAN X GPU's with 7 TFlops of single precision, 336.5 GB/s of memory and 12 GB of RAM memory per board.

Dataset

A dataset from three different soccer matches was collected. The matches played by the teams were recorded using a single Canon XA10 video camera. The camera was installed at a height of 15 feet and 20 feet away from the horizontal baseline of the soccer field. In order to collect high resolution and good quality images with enough pixels on the players body, the camera operator was allowed to pan and zoom depending on where the action is happening on the soccer field.

The dataset comprises 49,952 images, and it is annotated into two classes namely: players with the ball (12,586 images) and players without the ball (37,366 images). The dataset was annotated by five experts and the final label for a given image is obtained by taking the majority vote of the five annotators. The dataset is comprised of three teams whose jersey colors are white, red and blue. Out of the 49,952 images, the white team constitutes 27.95% of the dataset (13,959 images), the red team constitutes 34.82% of the dataset (17,392 images) and the blue team constitutes 37.24% of the dataset (18,600 images). Within the two classes, the white, red and blue team constitute 24.81%, 16.46% and 58.72% for players with the ball and 29%, 41% and 30% for players without the ball, respectively. Table 10 shows the data distribution of the three teams for the two classes.

TABLE 10

Data distribution of the three teams for the two classes.

| Class | White Team | Red Team | Blue Team |
|---|---|---|---|
| Player With Ball | 3,123 | 2,072 | 7,390 |
| Player Without Ball | 10,386 | 15,320 | 11,210 |

Clearly from Table 10, it can be seen that the dataset is highly unbalanced which makes it challenging. The reason for this is that, for every frame of the video only one person can control the ball which leaves 21 other players without the ball. But as the camera is being panned and zoomed not all 22 players are present in a single frame all the time, resulting in 25.2% of the data constituting for the class "players with the ball" and 74.8% of the data constituting for the class "players without the ball".

Furthermore, five test videos were used exclusively for evaluating the tracking, team identification and prediction of game analytics. The videos were categorized based on their complexity as easy, moderate and hard. In the easy complexity case, there are only 4 to 5 players spread wide apart usually in the defense zone and do not cause any occlusions. In the Moderate complexity case, there are 6 to 10 people in the mid-field region causing partial occlusion to the surrounding players and the ball. The hard complexity case is when there are more than 10 players gathered within a small area on the field causing a lot of occlusions. This usually occurs when a player tries to attempt a shot at the goal, making it very difficult to generate visual analytics.

Localization Results

An experiment was performed with two state-of-the-art CNN's namely: YOLO9000 and OpenPose for the localization of soccer players. Evaluations of both of the networks on five exclusive test videos, mentioned above, based on their average Intersection over Union (IoU). The YOLO9000 network achieved an IoU of 84.57% and the OpenPose network achieved an IoU of 69.84%. Both of the networks were able to detect players that were closer to the camera and as the players moved in the opposite direction the camera was facing, the number of pixels on player's body started to reduce making it difficult to detect them.

To solve this, applied was a grid-based localization method, where input frames of size 1920×1080 were divided into four equal sized cells. Each cell is of size 960×540 preserving the aspect ratio, and the system resized each of the cells individually to 1920×1080. Next, localization was performed individually on these four cells and concatenated the results into a single video frame. By doing this, achieved was an IoU of 73.27% and 85.21% using the OpenPose network and YOLO9000, respectively. FIG. 21A and FIG. 21B show an example of soccer player detection without and with grid-based resizing, respectively. It can be observed that in FIG. 21B two of the soccer players that are farther away from the camera and the goalkeeper are detected successfully after doing the grid-based resizing (see the magnified sub-image).

Tracking Results

The tracking algorithm on five test videos was evaluated. An average accuracy of 76.54%±6.37%. was achieved. The errors in tracking occur in difficult cases when two or more players overlap with each other, which causes the detector (YOLO9000) to detect them as a single player. This mostly occurs only when the striker enters the opposition area to attempt a shot at the goal. Even though multiple players were detected as one player, after these players separated from each other and were detected correctly, the tracking algorithm was still able to distinguish the players as they were before the overlapping occurred.

Team Identification Results

The histogram matching approach on five test videos were used for evaluating the detection and tracking algorithm. An average accuracy of 92.57%±2.92%. While calculating the accuracy, ignored were instances when multiple players overlapped each other. There were errors when a player is close to the opposite horizontal baseline away from the camera. The reason for this is that, the players have very few pixels on their body which causes errors while matching their histograms with the templates.

Results of CNN based Identification of Player with the Ball

In experiments, randomly selected was 75% of the data in each class as training data, 10% of the data for validation and 15% of the data for testing. The validation data was used to obtain the best parameters for each network as described above In order to observe how the color of the team jersey affects the networks, a new set of images was annotated that involves soccer players wearing black colored jerseys. These images were not used for training the network and were added exclusively to the testing dataset. Table 11. shows the summary of the data distribution for the training, validation and testing dataset.

TABLE 11

Data distribution for training, validation and testing.

| Dataset | Player with ball | Player without ball |
|---|---|---|
| Training set 75% | 9,440 | 2,802 |
| Validation set 10% | 1,258 | 3,736 |
| Testing set 15% + black jersey | 1,888 + 502 | 5,606 + 3,733 |

All the individual networks were evaluated in three different settings namely: 15% team dependent, 5% team dependent and team independent. In the 15% team dependent setting is used at 75% of the original dataset (red, white and blue jersey) for training. 15% of the original dataset and the black jersey for testing as shown in Table 11 was used. In the 5% team dependent setting the system used 85% of original dataset for training. 5% of the original dataset and the black jersey for testing was used. Finally, for the team independent setting 90% of the original dataset for training and the black jersey for testing was used.

Comparison of Different CNN Architectures

Table 12 and FIG. 22 show the mean accuracy obtained using the individual networks for the team dependent and team independent setting.

TABLE 12

Mean accuracy of all networks for the 3 settings.

| Network | 15% Team Dependent | 5% Team Dependent | Team Independent |
|---|---|---|---|
| SoccerNet 1 | 62.46% | 67.81% | 56.23% |
| SoccerNet 2 | 61.37% | 70.59% | 59.98% |
| VGG-16 | 80.21% | 78.34% | 70.71% |
| VGG-19 | 85.37% | 86.59% | 76.48% |
| ResNet18 | 75.48% | 81.23% | 70.62% |
| ResNet34 | 76.02% | 80.34% | 73.59% |
| AlexNet | 69.32% | 74.53% | 66.82% |

From Table. 12 and FIG. 22, it is observed that VGG-19 achieved the best performance for all the three settings. The mean accuracy for all the networks in the team independent setting was less compared to their respective team dependent settings. This indicates that, apart from learning the representation of a soccer ball, the convolutional filters are also storing some color information of the player jersey.

Visualization of Features Learned by the CNN

Figure 23:
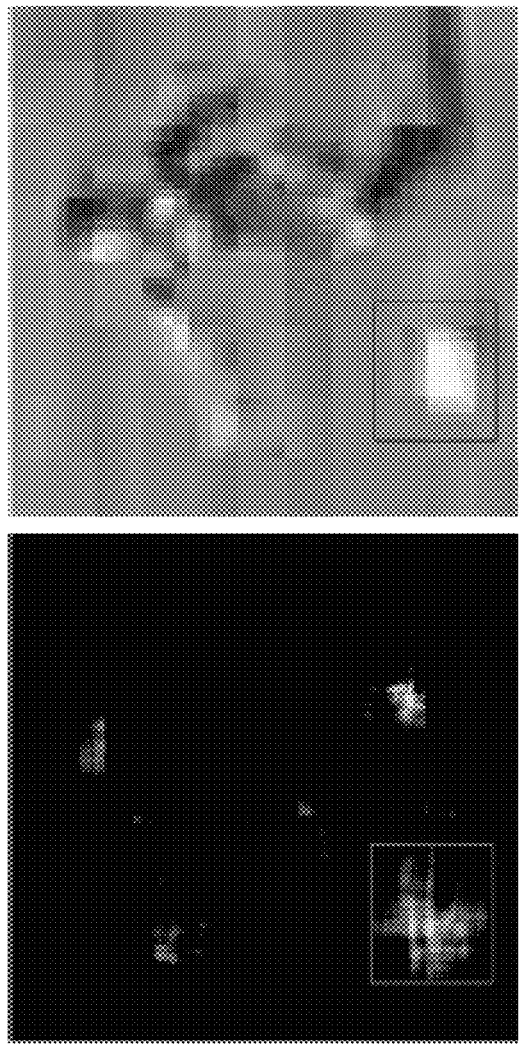
FIG. 23 shows the visualization of the probability score map for VGG-19.

FIG. 23 shows the visualization of the probability score map for VGG-19, when part of the image is hidden by a sliding square window of size 64×64. In FIG. 23, the image on the left is probability score map for the class "player with the ball". The brightness of the pixels in the probability score map indicate how strong of an indicator the corresponding pixel in the image is for detecting if the player has the ball.

Experiments were performed to check if using gray scale images improves the performance for the team independent setting. To achieve this, random parameter searches were performed for VGG-16 and VGG-19 to determine the best parameters for training the network with gray scale images. The system used the team independent setting with 90% of the original dataset for training and the black jersey team as the testing set (mentioned in Section 4.3). VGG-16 and VGG-19 achieved mean accuracy of 67.36% and 70.24% respectively.

Figure 24:
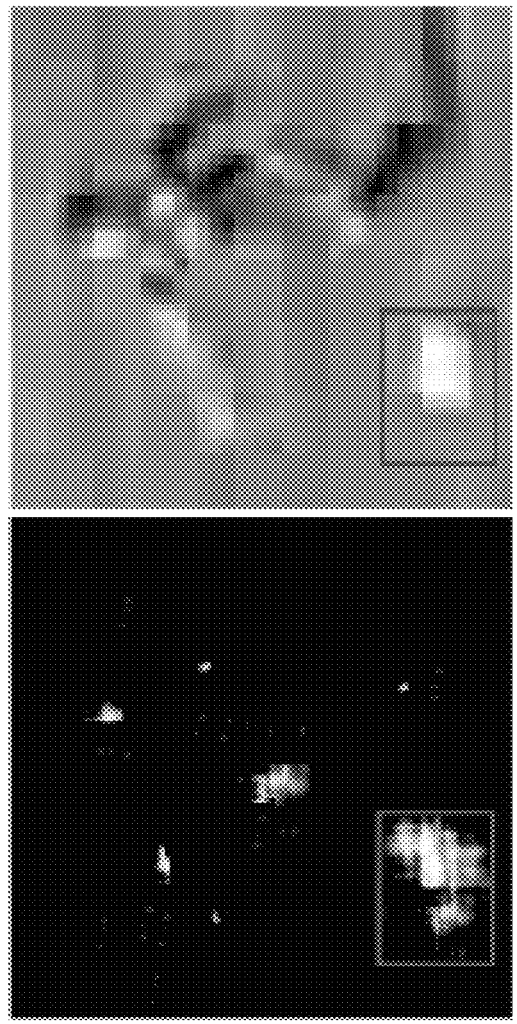
FIG. 24 shows another visualization of the probability score map for VGG-19.

FIG. 24 shows the visualization of the probability score map for VGG-19 for gray scale images. In order to obtain the gray scale images, the RGB images were converted to HSV and the V plane was used as the gray scale image. The mean accuracy achieved using the gray scale images was less compared to the mean accuracy achieved with the RGB images. The reason for this is that when the system converts the image to gray scale, the image loses some of its discriminative properties (white color of the ball) making it difficult for the network to generalize. In FIG. 24, it can be observed that, apart from the bright pixels corresponding to the ball, there are some very bright pixels that correspond to the color of the player's jersey. This indicates that the image is not very discriminative and the network is not generalizing well.

Effects of Dataset Augmentation on Selected CNN Architectures

Observing how augmenting the dataset affects the accuracy of VGG-16 and VGG-19 networks, a dataset was used consisting of 12,586 images of players with the ball to train the DCGAN model. The generator was designed to take as input a 100×1 dimensional noise vector randomly sampled from a uniform distribution. The output of the generator is an RGB image of size 128×128. The discriminator was designed to take as input an RGB image of size 128×128 and predict if the image is real or generated. The learning rate for the generator and discriminator are $10^{-4}$ and $10^{-5}$, respectively, with mini batch size 32 and the weights of the generator are updated after every two mini batches. Both the generator and discriminator were optimized using the Adam algorithm and Binary Cross Entropy loss function.

Figure 25:
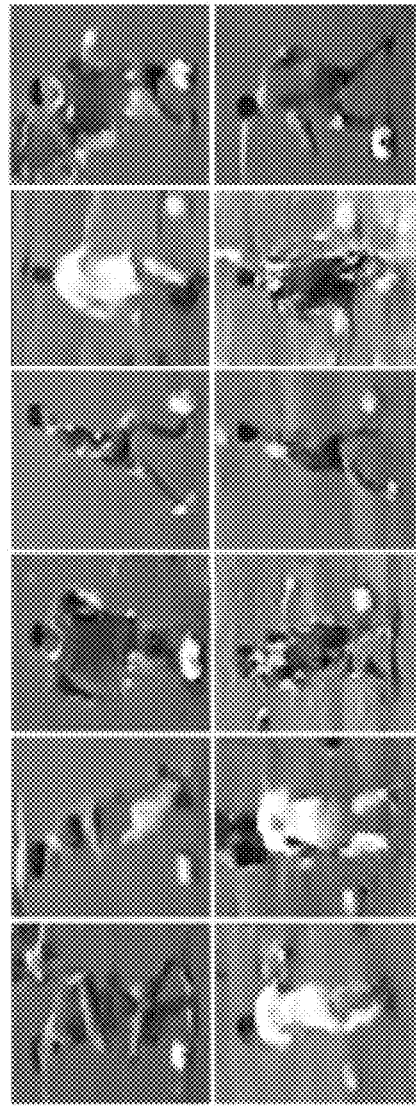
FIG. 25 shows generated images.

After training the DCGAN, it was observed that the system was able to learn the representation of a soccer player but was not able to completely learn the presence of the soccer ball. To overcome this, after partially training the DCGAN (the generator is able to generate some reasonable images), the generated images were passed to the already trained VGG-19 network to classify them. Based on the output from the VGG-19, the weights of the generator network are updated again. If the image generated is a player without the ball then the generator is penalized more, thus helping it to learn the correct representation of player with the ball. FIG. 25 shows some of the generated images.

Next, 20,000 images were generated of a player with the ball and augmented it to the training dataset. The VGG-16 and VGG-19 networks were trained and evaluated the network with the team independent setting (mentioned above). VGG-16 and VGG-19 achieved a mean accuracy of 72.13% and 79.54%, respectively. Comparing the results of the team dependent setting from Table 12 for VGG-16 and VGG-19, it is observed that augmenting the dataset helped improve the accuracy of the respective networks. Thus, adding more variability helps improve the performance of the network.

Results on Generating Game Analytics & Player Statistics

The accuracy was evaluated of the generated visual analytics on the five test case videos of varying complexities (easy, moderate and hard referred-to above). In the easy complexity case, the system was able to predict the visual analytics (i.e., which player controls the ball and when a pass is made) with accuracy of 84.73%. Achieved was an accuracy of 79.82% for the moderate complexity and accuracy of 67.28% for the hard complexity cases.

In the hard complexity case since the players are too close to each other causing occlusions, it is difficult for the network to identify which player is controlling the ball and leads to wrong visual analytics. This can be solved by identifying the player, who controls the ball just before he/she enters the opposition's zone and since he/she is attempting a shot at the goal, he/she is not going to pass the ball. Thus, the visual analytics processing can be paused for that duration and it can wait until the event is over to predict if the shot at the goal was successful.

Conclusions with Respect to Generating Visual Analytics and Player Statistics

The system is effective for generating automated visual analytics and player statistics for soccer videos. A new dataset that consists of multiple teams was collected. An Exhaustive evaluation on the dataset with team dependent and team independent settings was performed and these settings were observed for the effect on the performance of the networks. Shown was how training the networks on RGB and gray scale images affects the generalization ability of the network learned and how augmenting more images using generative adversarial networks to the dataset helps further to improve the performance. Also shown are how different scenarios of the soccer game affects the performance of the system and how it can be overcome.

IV. System Hardware

With reference to FIG. 26, an overview of the processor and database system is shown. A Deep Learning Box® Powered by NVIDIA® Tesla® GPUs comprises one preferred processing system 40 that can be used according to one embodiment. The player identification and analysis software 41 is stored on the processing system memory, for manipulating a database storage 48.

The database storage 48 may contain multiple tables, including a table for storing recognized player data 260. The records 262 of the player data table 260 may contain, for example, assigned player IDs for indexing, player names, player numbers, teams, and analyzed and recognized styles.

A video storage table 250 may store records 252 that contain the videos and video information being analyzed, including, for example, fields for the resolution of the videos, formats, size, and the like.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for athletic style recognition, comprising:
   an assembled collection of video clips that illustrate different players and play skills;
   an affine-transformation-based module capable of registering a sequence of frames with target players performing a target skill into a single image representation;
   a neural network trained to classify the target skill;
   wherein the target skill is dribbling, and the target players are soccer players; and
   a dribble energy image (DEI) configured to transfer a sequence of frames to an image representation using affine-transformation-based image registration.

2. The system of claim 1, wherein in the assembled collection of video clips are of real athletic play.

3. The system of claim 1, wherein the assembled collection of video clips is of simulated athletic play.

4. A system for athletic style recognition, comprising:
   an assembled collection of video clips that illustrate different players and play skills;
   an affine-transformation-based module capable of registering a sequence of frames with target players performing a target skill into a single image representation;
   a neural network trained to classify the target skill;
   wherein the neural network comprises a conditional generative adversarial network (GAN); and
   a module for constructing a dribbling player's joints model as probability conditions for training the conditional GAN to generate a dribble energy image (DEI) wherein objects are guided to follow an embedding of a soccer player's body.

5. The system of claim 4, comprising
   a module configured to train the neural network on team dependent and team independent datasets.

6. The system of claim 5, further comprising a real-time object detection module configured to predict multiple bounding boxes for an image along with respective class probabilities for each bounding box using YOLO9000.

7. The system of claim 5, wherein the network is trained on the PASCAL VOC 2007 dataset.

8. The system of claim 5, comprising a module for after detecting soccer players in consecutive frames using DeepSort tracking to track the players over consecutive frames and to formulate associations of the soccer players.

9. The system of claim 5, further comprising a module for performing histogram matching for identifying the team of a player.

10. The system of claim 5, further comprising a module for augmenting the datasets using DCGAN.

11. A method for athletic style recognition, comprising:
    assembling a collection of video clips that illustrate different players and play skills;
    registering, using an affine-transformation-based module, a sequence of frames with target players performing a target skill into a single image representation; and
    training a neural network to classify the target skill;
    wherein the target skill is dribbling, and the target players are soccer players; and
    providing a dribble energy image (DEI) configured to transfer a sequence of frames to an image representation using affine-transformation-based image registration.

12. The method of claim 11, wherein in the collection of video clips are of real athletic play.

13. The method of claim 11, wherein the collection of video clips is of simulated athletic play.

14. A method for athletic style recognition, comprising:
    assembling a collection of video clips that illustrate different players and play skills;
    registering, using an affine-transformation-based module, a sequence of frames with target players performing a target skill into a single image representation; and
    training a neural network to classify the target skill;
    wherein the target skill is dribbling, and the target players are soccer players; and
    wherein the neural network comprises a conditional generative adversarial network (GAN); and
    further comprising constructing a dribbling player's joints model as probability conditions for training the conditional GAN to generate a dribble energy image (DEI) wherein objects are guided to follow an embedding of a soccer player's body.

15. The method of claim 14, comprising
    training the neural network on team dependent and team independent datasets.

16. The method of claim 15, further comprising providing a real-time object detection module configured to predict multiple bounding boxes for an image along with respective class probabilities for each bounding box using YOLO9000.

17. The method of claim 15, wherein the network is trained on the PASCAL VOC 2007 dataset.

18. The method of claim 15, comprising a after detecting soccer players in consecutive frames using DeepSort tracking to track the players over consecutive frames and to formulate associations of the soccer players.

19. The method of claim 15, further comprising performing histogram matching for identifying the team of a player.

20. The method of claim 15, further comprising augmenting the datasets using DCGAN.

* * * * *